US011958774B2

(12) United States Patent
Aldykiewicz, Jr. et al.

(10) Patent No.: US 11,958,774 B2
(45) Date of Patent: Apr. 16, 2024

(54) HIGH SURFACE AREA INDUCERS FOR CEMENTITIOUS AGGREGATES PRODUCTION

(71) Applicant: GCP Applied Technologies Inc., Cambridge, MA (US)

(72) Inventors: Antonio J. Aldykiewicz, Jr., Lexington, MA (US); Klaus-Alexander Rieder, Beverly, MA (US); Michael D. Morgan, York, ME (US); Djassi-biko Rodrigues Pires, Nashua, NH (US)

(73) Assignee: GCP APPLIED TECHNOLOGIES INC., Alpharetta, GA (US)

( * ) Notice: Subject to any disclaimer, the term of this patent is extended or adjusted under 35 U.S.C. 154(b) by 516 days.

(21) Appl. No.: 17/050,099

(22) PCT Filed: May 11, 2018

(86) PCT No.: PCT/US2018/032361
§ 371 (c)(1),
(2) Date: Oct. 23, 2020

(87) PCT Pub. No.: WO2019/209353
PCT Pub. Date: Oct. 31, 2019

(65) Prior Publication Data
US 2021/0371337 A1  Dec. 2, 2021

Related U.S. Application Data

(60) Provisional application No. 62/663,344, filed on Apr. 27, 2018.

(51) Int. Cl.
*C04B 18/02* (2006.01)
*C04B 40/00* (2006.01)

(52) U.S. Cl.
CPC ........ *C04B 18/021* (2013.01); *C04B 40/0032* (2013.01)

(58) Field of Classification Search
None
See application file for complete search history.

(56) References Cited

U.S. PATENT DOCUMENTS 9,216,925 B2 * 12/2015 Ferrari ................... C04B 18/02
10,640,423 B2    5/2020 Zampini et al.
(Continued)

FOREIGN PATENT DOCUMENTS

AT        394714      6/1992
EP       2468695      6/2012
(Continued)

OTHER PUBLICATIONS

Roesky, From PCT/ISA/210, International Search Report for PCT/US2018/032361, dated Jan. 21, 2019, 3 pages.
(Continued)

*Primary Examiner* — John J Figueroa
(74) *Attorney, Agent, or Firm* — Armstrong Teasdale LLP

(57) ABSTRACT

Method and composition for producing aggregates from cement and concrete, including residual or returned concrete. Exemplary methods involve the use of an aggregate-forming inducer that provides a surface anchoring site for cement paste to bond/adhere, such as shredded news print, cardboard, or mixtures thereof, and also including fiber materials such as polymers, glass, and other material fibers. The aggregate-forming inducer is mixed with fresh concrete until aggregates are formed.

18 Claims, 3 Drawing Sheets

(56) References Cited

U.S. PATENT DOCUMENTS

| | | | |
|---|---|---|---|
| 10,662,121 B1* | 5/2020 | D'Avela | C04B 40/0231 |
| 11,345,644 B2* | 5/2022 | D'Avela | B28C 5/0806 |
| 11,548,832 B2* | 1/2023 | D'Avela | B28C 5/003 |
| 2014/0047999 A1* | 2/2014 | Razl | C04B 28/021 |
| | | | 106/676 |
| 2017/0217836 A1 | 8/2017 | Amirzadeh | |
| 2018/0105463 A1* | 4/2018 | Zampini | C04B 18/021 |

FOREIGN PATENT DOCUMENTS

| | | |
|---|---|---|
| JP | 2001261392 | 9/2001 |
| JP | 3147832 | 6/2012 |
| WO | 9511861 | 5/1995 |
| WO | 9621566 | 7/1996 |
| WO | 2016071298 | 5/2016 |
| WO | 2016188559 | 12/2016 |
| WO | 2016198384 | 12/2016 |

OTHER PUBLICATIONS

Roesky, From PCT/ISA/220, Written Opinion of the International Search Authority for PCT/US2018/032361, dated Jan. 21, 2019, 7 pages.

* cited by examiner

HIGH SURFACE AREA INDUCERS FOR CEMENTITIOUS AGGREGATES PRODUCTION

FIELD

Embodiments disclosed herein relate to a method for producing granular material or aggregates from concrete or other hydratable cementitious compositions, and more particularly to the use of an aggregate-forming inducer that provides a surface anchoring site for cement paste to bond/adhere to, such as shredded paper, cardboard, glass or polymer fibers, and the like to so produce the granular material or aggregates.

BACKGROUND

In the U.S., approximately 4% of concrete is returned to the ready mix plant due to several reasons, including not meeting specifications, over-ordering (e.g., the amount ordered exceeded the amount used for the job), job site issues resulting in delayed pour beyond the plastic life of the concrete, etc. Regardless of the reason for the return, the ready mix producer generally has to treat the returned concrete to facilitate reuse, recycle or discard it as industrial waste. For example, re-claimers may be used to recycle sand and aggregate. If managed correctly, the treatment water also can be used to manufacture fresh (unset) concrete.

It is known to produce aggregate particles from cement compositions, including concrete and residual or returned concrete. Such aggregate materials could be used to replace a portion of typical aggregates (e.g., sand, stone) in a different batch of concrete or for other construction purposes, such as roadbed material.

Such aggregates have been produced by methods which involve adding flash setting accelerators and super-absorbent polymers to fresh unset cement compositions and blending this mixture until granular materials were formed. Super-absorbent polymers (SAPs) are polymers that are capable of retaining large amounts of water in comparison to their weight. When SAPs come into contact with water, the water molecules diffuse into the void space inside the polymer network, hydrating the polymer chains, and achieving a high swelling ratio which is the ratio of the weight of the swollen SAPs to the dried SAPs. The swelling ratio is determined by the degree of branching and cross-linking, the chemical structure of the monomers that make up the SAPs network and external factors such as pH, ionic concentration of the solution and the temperature.

Methods for producing aggregates from non-hardened cement compositions are also known, in particular from concrete or residual concrete, which comprises adding (a) a water-absorbing agent and (b) a crystallization deactivator to a non-hardened cement composition and mixing until a granular material was formed. The method allows unneeded residues of still liquid concrete to be converted into a practical product, which could then be reused to produce new concrete compositions.

Similarly, there are methods for producing aggregates from "unsettled" cementitious mixtures which comprise the steps of (a) adding at least one "pelletizing" agent to the unsettled cementitious mixture, (b) mixing constantly the mixture of step (a) in a mixer to produce pellets, (c) discharging the pellets obtained in step (b) and (d) drying the pellets formed in step (c). The pelletizing agent is selected from the group consisting of cellulose, chitosan, collagen, polyacrylamide and co-polymers of polyacrylamide and polyacrylics, polyamines, polyvinylacohols, polysaccharides, lactic acid, methacrylic acid, methacrylate, hydroxyethyl, ethylene glycol, ethylene oxide, acrylic acid, inorganic flocculants, and inorganic coagulants. This method avoids using a flash setting accelerator while using a relatively high dosage of super-absorbent polymer.

The terms "paste," "mortar," and "concrete" are terms of art: pastes are mixtures composed of a hydratable cementitious binder (usually, but not exclusively, Portland cement, masonry cement, or mortar cement, and may also include limestone, hydrated lime, fly ash, blast furnace Slag, and Silica fume or other materials commonly included in Such cements) and water; mortars are pastes additionally including fine aggregate (e.g., Sand); and concretes are mortars additionally including coarse aggregate (e.g., gravel, Stones). In case the concrete is spray applied, the concrete is called shotcrete. For example, a cementitious composition may be formed by mixing required amounts of certain materials, e.g., hydratable cementitious binder, water, and fine and/or coarse aggregate, as may be desired, with high surface area materials such as shredded paper or fibers as described herein.

As a still further example, the use of a polymer encapsulated in a water-soluble bag, wherein the polymer, when released from the bag during mixing, absorbs water in the concrete and forms a gel structure around some of the fine aggregates contained in the concrete is known, thereby forming a granular material that could be used as road bed material.

It would be desirable to provide a method for producing granular material or aggregates from fresh concrete, shotcrete or other fluid hydratable cementitious compositions, such as residual or returned concrete or shotcrete, in an efficient and inexpensive manner, such that, for example, the granular material or aggregate can be put in stock piles, or reused in concrete, e.g., a batch of fresh or unset concrete different from the one from which the granular material or aggregates are produced. It also would be desirable to obtain granular material or aggregates resulting from this method, and use such material as aggregates. Also, producing granular material in accordance with embodiments disclosed herein is beneficial to avoid buildup of material on the sides, blades and chute, for example, of a concrete mixing drum that sometimes occurs with the use of set accelerators and other additives, and to quickly treat and discharge material from the truck or leaving the treated the material inside the truck and batch fresh concrete on top of it, minimizing total processing time.

SUMMARY

In departing from the prior art approaches to forming aggregates which are based on the use of "superabsorbent" polymers or "pelletizing" chemical compounds, the present inventors made the surprising discovery that adding additional surface area to a concrete mix by using materials with high specific surface areas can provide the ability to form aggregates within cements, concretes, and other cementitious materials, such as residual or returned concrete. This can be accomplished with or without the use of a set accelerator. Moreover, the aggregate-inducing material used in accordance with embodiments disclosed herein has the advantage that residual material remaining in the concrete truck or other vessel where it is mixed with the cementitious material does not alter the properties of the next batch of concrete added to the truck or vessel. Accordingly, methods disclosed herein enable the recycling of concrete by transforming the same into aggregates that then can be added into one or more different batches of concrete, for example. The batches of concrete to which the formed aggregates are added may themselves contain aggregates.

Embodiments disclosed herein are also believed to overcome the high unpredictability in the characteristics of the aggregate material, because the use of the high surface area materials decreases the workability and rheology of concrete materials, facilitating the formation of aggregate particles.

In certain embodiments, granular or aggregate material is produced from fresh concrete by the addition of a formulation comprising a granular or aggregate-forming inducer. In some embodiments, the aggregate-forming inducer provides a surface anchoring site for cement paste to bond/adhere to. In some embodiments, the aggregate-forming inducer comprises a fiber having an elongated body with a length to equivalent diameter ratio of at least 10, more preferable at least 50, wherein the equivalent diameter is defined by ACI 544.5R-10, Section 2.2-Definitions, diameter of a circle having an area equal to the average cross sectional area of a fiber. In some embodiments, the aggregate-forming inducer, when added to concrete or cementitious material, introduces additional anchoring surface area for cement paste between 275 and 50,000 square meters per cubic meter of concrete, preferably between 500 and 10,000 square meters per cubic meter of concrete, most preferably between 1,000 and 5,000 square meters per cubic meter of concrete. In some embodiments, the aggregate-forming inducer is a water-absorbing component that exhibits a high capacity to absorb water per unit weight of water-absorbing material. In certain embodiments, the formulation is devoid of a set accelerator. In certain embodiments, the formulation is devoid of a water-absorbing component. In certain embodiments, the formulation is devoid of both a set accelerator and a water-absorbing component. In some embodiments, the aggregate-forming inducer is news print. In some embodiments, the news print is post-consumer newsprint. In some embodiments, the news print is untreated; e.g., it is not rendered hydrophobic. In some embodiments, the news print is or has been mechanically shredded and/or cut into small pieces similar to the shredding of paper documents with conventional shredders. The pieces can be as small as one millimeter or less. The degree of shredding can be characterized by the particle size distribution measured using sieve analysis. Typically, shredded materials will pass through a sieve size of less than 20 mesh (0.841 mm). Retention of material starts at 20 mesh or greater (0.841 mm or less).

In some embodiments, an aggregate-forming inducer that is an additive or admixture is provided that, when added to fresh or plastic concrete, converts the concrete to granular material that can be reused. In some embodiments, the aggregate-forming inducer is provided in a container or housing, such as a paper bag.

Without being limited to any particular theory, it is believed that the aggregate-forming inducer, when introduced into the plastic mix, introduces more surface area for the cement paste/mortar to adhere to. As a consequence, there is less paste to form a continuous network to adhere aggregate. As a result, the workability and rheology of the concrete mix is significantly reduced as measured using the slump cone test, ASTM C143/C143M, Standard Test Method for Slump of Hydraulic-Cement Concrete. The net result is the conversion of the plastic material to a granular form.

In some embodiments, the resulting granular material obtained by the methods disclosed herein is used as aggregate in fresh concrete, replacing up to (but not limited) about 60% of conventional aggregates, for example. In some embodiments, the granular material is added to concrete in amounts between 100-1600 lbs/yd$^3$, more preferably between 178 and 710 lbs/yd$^3$ of cementitious material.

In certain embodiments, a method for producing aggregate particles from cementitious compositions is provided, the method comprising: combining a cementitious composition and at least one aggregate-forming inducer, wherein the at least one aggregate-forming inducer has a specific surface area of at least 10 square meters per kilogram; and mixing said cementitious composition with said aggregate-forming inducer until the mixed components form granular material.

In some embodiments, the cementitious composition is residual or returned concrete. In some embodiments, the cementitious composition is a cementitious paste fraction separate from residual or returned concrete.

In some embodiments, the at least one aggregate-forming inducer is chosen from paper, cardboard, corrugated cardboard, cartons, corrugated cartons, crepe paper, news print, kraft paper, wall paper, wax paper, silk paper; shredded currencies removed from circulation (US and Foreign); wood fibers; glass fibers; shredded textiles; cotton fibers; hemp; mineral fiber chosen from wollastonite, mica, rock wool, slag wool, and graphite; polyolefin fibers; polyvinyl alcohol (PVA); carbon fibers; nylon; para-aramid synthetic fiber; polyester fibers, natural fibers chosen from sisal fibers, cotton, flax, jute, coconut husks, protein-based fibers, banana, pineapple, wool, mohair and silk; shredded polystyrene, shredded PET; and mixtures of any of the foregoing.

In a first exemplary embodiment, a method for producing aggregate particles from cementitious compositions is disclosed, the method comprising: combining in a vessel a cementitious composition and at least one aggregate-forming inducer that provides a surface anchoring site for cement paste to bond/adhere to, wherein the at least one aggregate-forming inducer comprises a fiber having an elongated body with a length to equivalent diameter ratio of at least 10 and that when added to concrete, introduces anchoring surface area for said cementitious composition between 275 and 50,000 square meters per cubic meter of cementitious composition.

In a second exemplary embodiment, which can be based on any of the other exemplary embodiments, the fiber has an elongated body with a length to equivalent diameter ratio of at least 50.

In a third exemplary embodiment, which can be based on any of the other exemplary embodiments, the anchoring surface area is between 500 and 10,000 square meters per cubic meter of cementitious composition.

In a fourth second exemplary embodiment, which can be based on any of the other exemplary embodiments, the anchoring surface area is between 1,000 and 5,000 square meters per cubic meter of cementitious composition.

In a fifth exemplary embodiment, which can be based on any of the other exemplary embodiments, the vessel is the drum of a concrete mixing truck.

In a sixth exemplary embodiment, which can be based on any of the other exemplary embodiments, the time needed to combine the at least one aggregate-forming inducer and the cementitious composition and convert the resulting mix to a granular material is 1 to 10 minutes per cubic yard of cementitious composition.

In a seventh exemplary embodiment, which can be based on any of the other exemplary embodiments, the aggregate-forming inducer does not negatively impact subsequent concrete mixes with regard to its plastic and hardened properties chosen from air entrainment, unit weight, slump, set time and strength.

In an eighth exemplary embodiment, which can be based on any of the other exemplary embodiments, the cementitious composition is residual or returned concrete.

In a ninth exemplary embodiment, which can be based on any of the other exemplary embodiments, the cementitious composition is a cementitious paste fraction (e.g., devoid of aggregate) separate from residual or returned concrete.

In a tenth exemplary embodiment, which can be based on any of the other exemplary embodiments, the at least one aggregate-forming inducer is chosen from shredded and/or cut paper, cardboard, corrugated cardboard, cartons, corrugated cartons, crepe paper, news print, kraft paper, wall paper, wax paper, silk paper; shredded currencies removed from circulation (US and Foreign); wood fibers; glass fibers; shredded textiles; cotton fibers; hemp; mineral fiber chosen from wollastonite, mica, rock wool, slag wool, and graphite; polyolefin fibers; polyvinyl alcohol (PVA); carbon fibers; nylon; para-aramid synthetic fiber; polyester fibers, natural fibers chosen from sisal fibers, cotton, flax, jute, coconut husks, protein-based fibers, banana, pineapple, wool, mohair and silk; shredded polystyrene, shredded PET; and mixtures of any of the foregoing.

In a first aspect of the tenth exemplary embodiment, the polyolefin fibers are polypropylene fibers, polyethylene fibers or blends thereof.

In a second aspect of the tenth exemplary embodiment, the polyolefin fibers are polypropylene fibers, polyethylene fibers or blends thereof having a length between 1 mm and 60 mm.

In a third aspect of the tenth exemplary embodiment, the polyolefin fibers are polypropylene fibers, polyethylene fibers or blends thereof have a surface area per unit weight between 100 and 400 square meters per kilogram.

In a fourth aspect of the tenth exemplary embodiment, the polyolefin fibers are polypropylene fibers, polyethylene fibers or blends thereof have a surface area per unit weight between 200 and 250 square meters per kilogram.

In an eleventh exemplary embodiment, which can be based on any of the other exemplary embodiments, said aggregate-forming inducer is news print.

In a first aspect of the eleventh exemplary embodiment, the news print is shredded and/or cut.

In a second aspect of the eleventh exemplary embodiment, the news print is shredded and has a surface area per unit weight between 10 and 500 square meters per kilogram.

In a third aspect of the eleventh exemplary embodiment, the news print is shredded and has a surface area per unit weight between 15 and 300 square meters per kilogram.

In a twelfth exemplary embodiment, which can be based on any of the other exemplary embodiments, the cementitious composition is returned concrete in a delivery truck mixer-drum, and the at least one aggregate-forming inducer is shredded newsprint.

In a thirteenth exemplary embodiment, which can be based on any of the other exemplary embodiments, an admixture chosen from one or more set accelerators, set retarders, water reducers, rheology modifiers chosen from clay, super absorbent polymers and thickeners, corrosion inhibitors, shrinkage reducing admixtures, colorants, air entrainers, air detrainers, and combinations thereof.

In a first aspect of the thirteenth exemplary embodiment, wherein said set accelerator is aluminum sulfate, aluminum trihydrate, calcium nitrate, calcium nitrite, calcium chloride, sodium nitrate, thiocyanate or mixtures thereof.

In a fourteenth exemplary embodiment, which can be based on any of the other exemplary embodiments, a super absorbent polymer chosen from sodium polyacrylate and polyacrylic acid is added.

In a fifteenth exemplary embodiment, which can be based on any of the previous other exemplary embodiments, aggregate particles formed by the method of the first exemplary embodiment are disclosed.

In a sixteenth exemplary embodiment, which can be based on any of the other exemplary embodiments, a packaged admixture is disclosed, the admixture comprising an aggregate-forming inducer comprising a fiber having an elongated body with a length to equivalent diameter ratio of at least 10 and that when added to concrete and an admixture chosen from one or more of set accelerators, set retarders and rheology modifiers.

In a first aspect of the sixteenth exemplary embodiment, the fiber has an elongated body with a length to equivalent diameter ratio of at least 50.

In a seventeenth exemplary embodiment, which can be based on any of the other exemplary embodiments, a single-use container consisting essentially of one or more aggregate-forming inducers having an elongated body with a length to equivalent diameter ratio of at least 10 is disclosed.

In a first aspect of the seventeenth exemplary embodiment, the one or more aggregate-forming inducers is news print.

In a second aspect of the seventeenth exemplary embodiment, the container is a paper bag.

In a third aspect of the seventeenth exemplary embodiment, the container is a water soluble bag.

In a fourth aspect of the seventeenth embodiment, the container is a pulpable bag.

In a fifth aspect of the seventeenth embodiment, the container is a plastic bag.

In a sixth aspect of the seventeenth embodiment, the container is a wrap covering the side of a cylinder.

In an eighteenth exemplary embodiment, which can be based on any of the other exemplary embodiments, a method for producing aggregate particles from cementitious compositions is disclosed, comprising: combining a cementitious composition and a formulation consisting essentially of at least one aggregate-forming inducer, wherein the at least one aggregate-forming inducer when added to said cementitious composition introduces surface area between 275 and 50,000 square meters per cubic meter of cementitious composition, and mixing said cementitious composition with said formulation until the mixed components form granular material.

In a nineteenth exemplary embodiment, which can be based on any of the other exemplary embodiments, the formulation is combined with said cementitious material with a conveyor belt, a pneumatic system, a blower or a dispenser.

In a twentieth exemplary embodiment, which can be based on any of the other exemplary embodiments, the aggregate-forming inducer, when added to the cementitious composition, introduces surface area between 500 to 10,000 square meters per meter of cementitious composition.

In a first aspect of the twentieth embodiment, the aggregate-forming inducer, when added to the cementitious composition, introduces surface area between 1,000 to 5,000 square meters per meter of cementitious composition.

In a twenty-first exemplary embodiment, which can be based on any of the other exemplary embodiments, a cementitious composition is disclosed, comprising a paste portion and aggregate formed by the method of the first exemplary embodiment.

Further advantages and benefits are further described in detail hereinafter.

BRIEF DESCRIPTION OF DRAWINGS

Benefits and features of the embodiments disclosed herein may be more readily appreciated when the following written description of exemplary embodiments is considered in conjunction with the drawings, as described in the ensuing paragraphs.

DETAILED DESCRIPTION OF EXEMPLARY EMBODIMENTS

Figure 1:
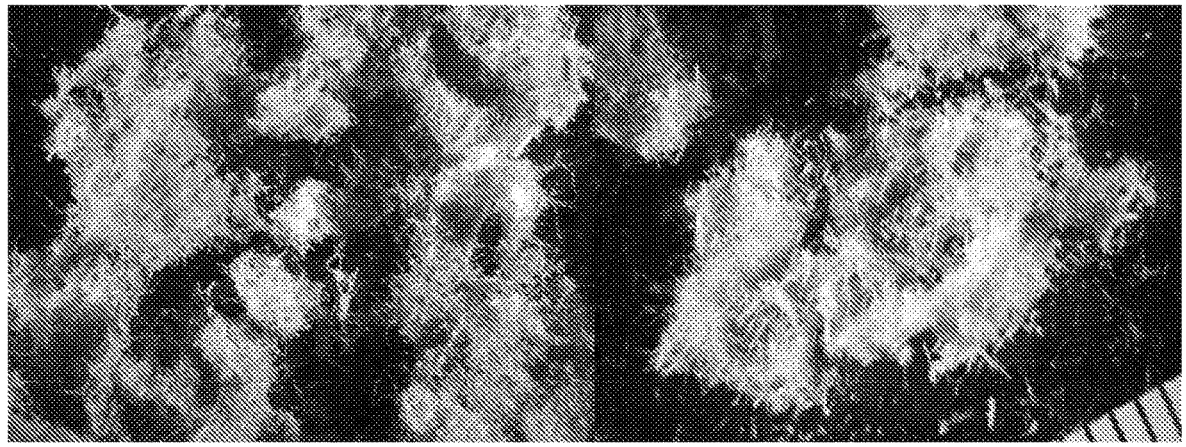
FIG. 1 is a digital photograph of shredded post-consumer news print (at 1.0×, graduated scale is in units of 1 mm) used as an aggregate-forming inducer in accordance with embodiments disclosed herein.

The singular forms "a," "an," and "the" include plural referents unless the context clearly dictates otherwise.

As used in the specification, various devices and parts may be described as "comprising" other components. The terms "comprise(s)," "include(s)," "having," "has," "can," "contain(s)," and variants thereof, as used herein, are intended to be open-ended transitional phrases, terms, or words that do not preclude the possibility of additional components.

The terms "concrete" or "shotcrete" typically refer to a mixture of cement (which often contains supplementary cementitious materials such as limestone, fly ash, granulated blast furnace slag and other pozzolanic materials) and aggregates (e.g., fine aggregate such as sand, coarse aggregate such as gravel) and optionally one or more chemical admixtures (e.g., plasticizers for increasing workability, set accelerators, set retarders, air entrainers, air detrainers, plastic shrinkage reducing admixtures, corrosion inhibitors (for rebar) for modifying concrete in its plastic or hardened state. Concrete is considered to be hydratable material in that the addition of water into the mixture of cement and aggregates initiates a hardening reaction.

The term "cement" includes hydratable cement such as Portland cement which is produced by pulverizing clinker consisting of hydraulic calcium silicates, aluminates and aluminoferrites, and one or more forms of calcium sulfate (e.g., gypsum) as an interground additive. Typically, Portland cement is combined with one or more supplemental cementitious materials, such as fly ash, granulated blast furnace slag, limestone, natural pozzolans, or mixtures thereof, and provided as a blend, all of which binds aggregates together to make concrete.

The term "cementitious" may be used herein to refer to materials that comprise Portland cement, CSA cement or which otherwise function as a binder to hold together fine aggregates (e.g., sand) and coarse aggregates (e.g., crushed gravel, stone) which are used for constituting concrete. The cementitious compositions may be formed by mixing required amounts of certain materials, e.g., hydratable cement, water, and fine and/or coarse aggregate, as may be applicable to make the particular cement composition being formed.

In the concrete industry, the term "aggregate" typically means and refers to sand and/or stone particles, typically having average size of 0.5 to 50 mm. Aggregates may also comprise calciferous, siliceous or siliceous limestone minerals. Such aggregates may be of either the "natural" type (e.g., derived from glacial, alluvial, or marine deposits which are typically weathered such that the particles have smooth surfaces) or may be of the "manufactured" type, which are made using mechanical crushers or grinding devices. Coarse aggregate stone particles are typically grouped into various size fractions as described for instance in ASTM C33/C33M-18. As the size fraction used is controlled by various factors, including, but not limited to, the space between reinforcing bars in a proposed construction, aggregate size is often important in concrete mix designs.

As used herein, the term "aggregate" is used as well to refer to cement or concrete particles made through exemplary processes disclosed herein which involve mixing with cement, concrete, mortar, other cementitious materials, or combinations thereof, an aggregate-forming inducer which may be a high surface area material such as post-consumer newsprint.

As used herein, the phrase "consisting essentially of" limits the scope of a claim to the specified materials or steps and those that do not materially affect the basic and novel characteristics of the claimed subject matter. The term permits the inclusion substances which do not materially affect the basic and novel characteristics of the composition, formulation or method under consideration. Accordingly, the expressions "consists essentially of" or "consisting essentially of" mean that the recited embodiment, feature, component, etc. must be present and that other embodiments, features, components, etc., may be present provided the presence thereof does not materially affect the performance, character or effect of the recited embodiment, feature, component, etc. The presence of impurities or a small amount of a material that has no material effect on a composition is permitted. Also the intentional inclusion of small amounts of one or more non-recited components that otherwise have no material effect on the character performance of a composition is still included within the definition of "consisting essentially of". For example, a formulation consisting essentially of an aggregate-forming inducer in accordance with embodiments disclosed herein contains no superabsorbent polymer or set accelerator. Similarly, for example, a method consisting essentially of combining a cementitious composition and at least one aggregate-forming inducer, and mixing the cementitious composition with the aggregate-forming inducer until the mixed components form granular material, includes no steps of adding or otherwise involving a superabsorbent polymer or set accelerator to form the aggregate.

In some embodiments, an aggregate-forming inducer that is an additive or admixture is provided that, when added to and mixed with fresh or plastic concrete, converts the concrete to granular material that can be reused in a different batch of concrete or other cementitious material. In some embodiments, the resulting granular material then may be used as aggregate in fresh (e.g., unset) concrete. The components may be mixed directly in a conventional cement mixing truck or by other suitable mixing equipment.

The resulting granular material may be used as a substitute for conventional aggregate, such as course aggregate. It can totally replace the aggregate, or can replace only a portion thereof, such as 10%, 20%, 40%, 60% or greater.

An exemplary method for producing aggregate materials from cement or concrete, comprises: combining a cementitious composition and at least one aggregate-forming inducer in a vessel, wherein the at least one aggregate-forming inducer is characterized by having a specific surface area of at least 10 square meters per kilogram; and adding (e.g., blending, mixing or otherwise interdispersing) these components together until the additional surface area added to the mix is 400 square meters or greater; wherein mixed components form aggregate particles. In some embodiments the vessel is the rotatable drum of a concrete mixing truck. In some embodiments, the components may be added to the cement or concrete in a drum of a concrete mixing truck while the concrete drum is slowly turning. After all the components are added to the mix, the rotation rate of the drum may be set to between 10 and 15 rpm and mixed for approximately 3 minutes. In some embodiments, the material may then discharged to form a pile, for example. The method may be carried out under a variety of environmental conditions. In fact, the method is independent of environmental conditions. The method may be carried out within or under normal operating conditions or constraints for concrete. In some embodiments the method may be carried out wherein the vessel is a rotatable concrete mixer drum mounted on a concrete ready-mix delivery vehicle, and further wherein concrete within the mixer drum is monitored by an automated slump monitoring system to ensure that the aggregate-forming inducer becomes uniformly mixed within concrete contained within the mixer drum. In some embodiments, the material may not be discharged to form a pile, but left in the mixing vessel and fresh concrete may be batched on top of it, for example.

Other vessels in which the aggregate-forming inducer and cementitious material are combined and mixed may be used, including vats, mixers, etc.

Certain embodiments relate to the material obtained by the methods disclosed herein. An exemplary additive formulation for introducing into cement or concrete to produce aggregate particles may comprise an aggregate-forming inducer that is a water absorbing component having a high water absorption rate ratio. For example, there's a range of water absorption rate or capacity for a host of different materials. Soil, for example will typically have a range of water absorption capacity between 0.3 and 0.6 grams/gram of soil. Super absorbent polymers (SAP) will have a water absorption capacity between 50 and 200 grams/gram of SAP. Both materials can be used to convert plastic concrete to a granular form, the only important difference being the amounts necessary. The formulation may include one or more other ingredients, such as set accelerators and/or set retarders.

Suitable aggregate-forming inducers include cellulose fibers such as shredded and/or cut paper, cardboard, corrugated cardboard, cartons, corrugated cartons, crepe paper, news print, kraft paper, wall paper, wax paper, silk paper; shredded currencies removed from circulation (US and Foreign); wood fibers; glass fibers; shredded textiles; cotton fibers; hemp; mineral fiber chosen from wollastonite, mica, rock wool, slag wool, and graphite; polyolefin fibers; polyvinyl alcohol (PVA); carbon fibers; nylon; para-aramid synthetic fiber; polyester fibers, natural fibers chosen from sisal fibers, cotton, flax, jute, coconut husks, protein-based fibers, banana, pineapple, wool, mohair and silk; shredded polystyrene, shredded PET; and mixtures of any of the foregoing.

In certain embodiments, the fiber or fibers have elongated bodies with a length to equivalent diameter ratio of at least about 10, preferably at least about 50. In certain embodiments, when the fibers are added to the cementitious composition such as concrete, they introduce anchoring surface area for the cementitious composition between 275 and 50,000 square meters per cubic meter of cementitious composition. In accordance with certain embodiments, the amount of aggregate-forming inducer used is such that the additional surface area added to the mix is at least about 400 square meters per cubic meter of concrete, preferably at least about 1000 square meters per cubic meter of concrete, more preferably at least about 1500 square meters per cubic meter of concrete or cementitious material. The higher amounts of aggregate-forming inducer result in decreased workability of the resulting composition, facilitating the formation of granular material. In accordance with certain embodiments the fiber having an elongated body increases its specific surface area during mixing of the concrete due to surface roughening or fibrillation by at least 10 percent. In accordance with certain embodiments the fiber having an elongated body increases its specific surface area during mixing of the concrete due to surface roughening or fibrillation by at least 50 percent.

In some embodiments, the aggregate-forming inducer is a formulation that may include a water absorbing component that exhibits a high water absorption capacity such as a super absorbent polymer. In certain embodiments, the formulation is devoid of a set accelerator. In certain embodiments, the formulation is devoid of a set retarder. In certain embodiments, the formulation is devoid of both a set accelerator and a set retarder. In some embodiments, the aggregate-forming inducer is shredded news print. In some embodiments, the news print is untreated; e.g., it is not rendered hydrophobic.

In a preferred embodiment, the aggregate-forming inducer is news print that has been shredded and/or cut. Suitable material is CF100 commercially available from JRS and has the following specifications:

| Average Particle size (% Retained) | | | | Fiber | Viscosity | Viscosity | Ash | Moisture | Oil Absorption |
|---|---|---|---|---|---|---|---|---|---|
| 20 Mesh | 60 Mesh | 100 Mesh | 140 Mesh | Length Average | (Water)) 4% conc. | (30 W Oil) 2% conc. | Content Max | Content Max | Times Weight |
| 35-72 | 6-17 | 1-3 | 2-4 | 1.31 mm | 16700 cP | 140000 cP | 15% | 7% | 11X |

Figure 2:
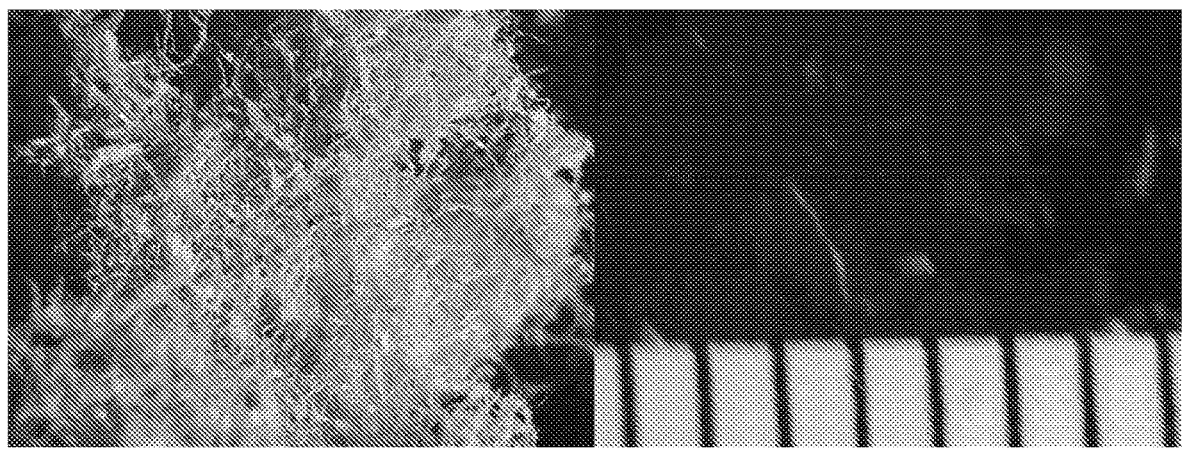
FIG. 2 is a digital photograph of shredded post-consumer news print (at 1.6×, graduated scale is in units of 1 mm) used as an aggregate-forming inducer in accordance with embodiments disclosed herein.
Figure 3:
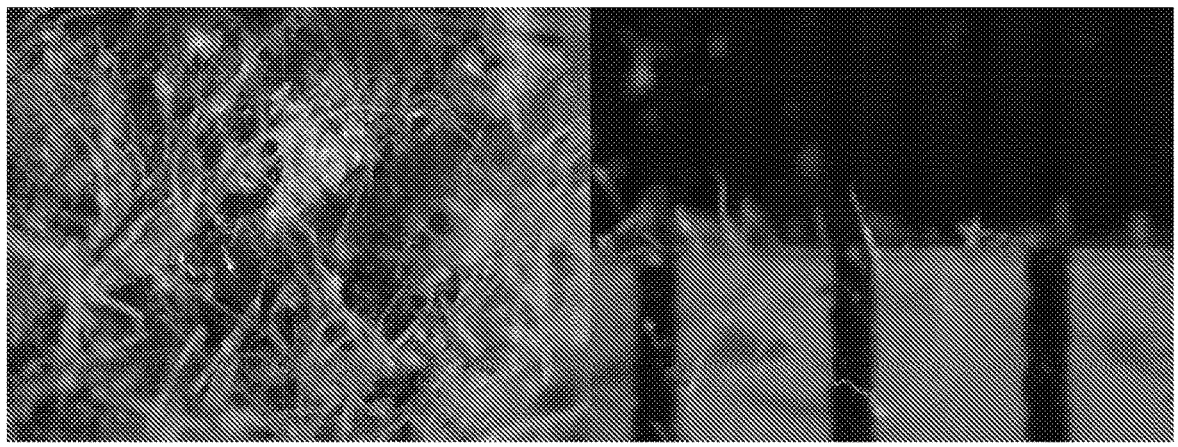
FIG. 3 is a digital photograph of shredded post-consumer news print (at 4.0×, graduated scale is in units of 1 mm) used as an aggregate-forming inducer in accordance with embodiments disclosed herein.

FIGS. 1, 2 and 3 show shredded post-consumer news print at different magnifications. The material appears to be fractal in nature where there's a combination of fine and coarse material at different length scales. The fine material are individual fibers or fibrous in nature and the coarse material is comprised of an agglomerate of fibers. There are also pieces of paper that have not been shredded. A combination of shredded and non-shredded news print may be used. Preferably the majority of the news print is shredded.

In certain embodiments, the aggregate-forming inducer may be introduced to cementitious material directly in a concrete mixing truck containing the cementitious material. In some embodiments, the aggregate-forming inducer is introduced to the cementitious material with a driving force such as a pneumatic system that uses pressurized air or other gas insert to the ingredients used. The pneumatic system may blow the inducer into a concrete mixing truck containing the cementitious material, such as a ready-mix truck with a rotatable drum. The inducer may be blown into the drum using forced air while the drum is rotating, or prior to rotating the drum, and when a suitable amount of inducer has been added, the speed of the drum rotation may be increased to thoroughly mix the inducer and cementitious material. A mixing time of about 1 to 10 minutes per cubic yard of concrete and a drum rotation rate between 10 and 15 rpm have been found to be suitable. Alternatively, the inducer may be introduced by adding containers of the inducer, such as paper bags, pulpable bags, and/or water-soluble polymer bags, plastic bags into the vessel containing the cementitious material. Other methods of introducing the inducer into the cementitious material may be used, including a conveyor belt transporting the inducer to a vessel containing the cementitious composition, manually adding the inducer to a vessel containing the cementitious composition, or using one or more automatic dispensers to dispense the inducer to a vessel containing the cementitious composition, and are within the scope of the embodiments disclosed herein. In some embodiments, the inducer may be introduced by manually feeding compressed material in the form of blocks, cubes or tubes and allowing the inducer to be broken up in the drum during mixing. In some embodiments, the cementitious composition may be introduced to the vessel after the inducer is added to the vessel. In some embodiments, the aggregate-forming inducer will increase its specific surface area due to surface roughening or fibrillation of filaments.

In certain embodiments wherein the vessel is a rotatable concrete mixer drum mounted on a concrete ready-mix delivery vehicle, and further wherein concrete within the mixer drum is monitored by an automated slump monitoring system to ensure that the aggregate-forming inducer becomes uniformly mixed within concrete contained within the mixer drum.

The cementitious material may be a cementitious paste fraction separate from residual or returned concrete, and thus may not comprise sand and/or stone aggregate.

In certain embodiments, one or more set accelerators may be used, and may be introduced to the cementitious material simultaneously with the aggregate-forming inducer, or after the aggregate-forming inducer has been added. The set accelerator may be blended with the aggregate-forming inducer prior to introduction into the cementitious material, or it may be added to the cementitious material separately from the aggregate-forming inducer. The set accelerator may be added in equal amounts, by weight, of the aggregate-forming inducer. Suitable set accelerators are those conventionally used in the art to accelerate set, including calcium aluminum hydrates, aluminum sulfate, calcium nitrate, calcium nitrite, calcium formate, calcium chloride, sodium nitrate, and thiocyanate, etc.

In certain embodiments, one or more set retarders may be used, and may be introduced to the cementitious material simultaneously with the aggregate-forming inducer, or after the aggregate-forming inducer has been added. The set retarder may be blended with the aggregate-forming inducer prior to introduction into the cementitious material, or it may be added to the cementitious material separately from the aggregate-forming inducer. The set retarder may be added in amounts equal to approximately 5 to 50 ounces per 100 lbs of cement. Suitable set retarders are those conventionally used in the art to retard set, including lignin, tartaric acid and salts thereof, lignosulfonates acids, hydroxylated carboxylic acids, carbohydrates, etc.

In certain embodiments, one or more superabsorbent polymers may be used, and may be introduced to the cementitious material simultaneously with the aggregate-forming inducer, or after the aggregate-forming inducer has been added. The superabsorbent polymer may be blended with the aggregate-forming inducer prior to introduction into the cementitious material, or it may be added to the cementitious material separately from the aggregate-forming inducer. Suitable amounts of superabsorbent polymer are approximately 2 lbs/yd$^3$ or greater. Suitable superabsorbent polymers are those conventionally used in the art, and may include sodium polyacrylate, carboxyalkyl cellulose polymers, carboxyalkyl starch polymers, alginates, chitosans, and starches. Also, polymers from the group of polyacrylic acid polymers, polyacrylamide polymers and polyaspartic acid polymers.

Other ingredients typically added to concrete also may be used, including colorants, pigments, dyes, air entraining agents, air de-training agents, etc.

In certain embodiments, a container or housing suitable for introduction into a load of cementitious material is provided. The container may contain one or more of an aggregate-forming inducer, one or more set accelerators, one or more set retarders and/or one or more superabsorbent polymers or thickeners. In some embodiments, the container is a single-use container that has no negative impact on the properties of the resulting concrete, such as a paper bag. In some embodiments, the container contains only one or more aggregate-forming inducers. In some embodiments, the container contains only one or more aggregate-forming inducers and one or more a set accelerators. In some embodiments, the container contains only one or more aggregate-forming inducers and one or more a superabsorbent polymers. In certain embodiments, one or more of any of these containers are manually introduced in to a drum of a ready-mix truck containing concrete or other cementitious material, and the drum of the truck is rotated at a sufficient speed and for a sufficient time to cause the formation of aggregates.

The mixing time for mixing the aggregate-forming inducer and cementitious material is not particularly limited. Generally a mixing time of about 1 to 10 minutes per cubic yard of concrete by rotating the drum of a typical ready-mix truck is sufficient. The mixing time may be determined by visual inspection to see if the granular material has been formed. Suitable ready-mix drum mixing speeds are between 5 and 25 rpm, preferably between 10 and 15 rpm. In certain embodiments, the VERIFI® In-transit Concrete Management system commercially available from GCP Applied Technologies may be used to monitor the properties of the mix during conversion to a granular form and determine when the conversion is complete.

An important advantage of the methods disclosed herein is that the addition of an aggregate-forming inducer to a vessel, particularly a drum of a cement truck, in accordance with embodiments disclosed herein, minimizes material build-up on the drum or drum components, and thus does not materially impact the properties of subsequent loads of cementitious material added to the truck. For example, in certain embodiments, the nature of the aggregate-forming inducer in accordance with embodiments disclosed herein is such that no or only minimal residual material remains in the truck, and of residual material that does remain on any of the various components of the truck, including drum inner walls, blades and chute, causes little or no change or effect on the properties (e.g., slump, amount of air entrainment, strength, etc.) of subsequent loads after the treated load is discharged from the truck, and will have no negative impact on any such properties.

The embodiments disclosed herein now will be described more fully hereinafter with reference to the accompanying drawings, in which various exemplary embodiments are shown illustrating variations within the scope of this disclosure.

Unless otherwise indicated, the shredded news print used in the following Examples was post-consumer shredded news print having the following particle size distribution as measured using sieve analysis: between 45 and 62% was retained on a mesh 20 sieve, and between 12 and 21% was retained on a 40 mesh sieve. The ash content was between 3 and 20% and the moisture content was approximately 7%.

Also unless otherwise indicated, slump cone measurements, per ASTM C143/C143M, were used to show how the addition of shredded post-consumer news print (or other aggregate-inducing formers) reduces concrete workability and rheology.

Figure 4:
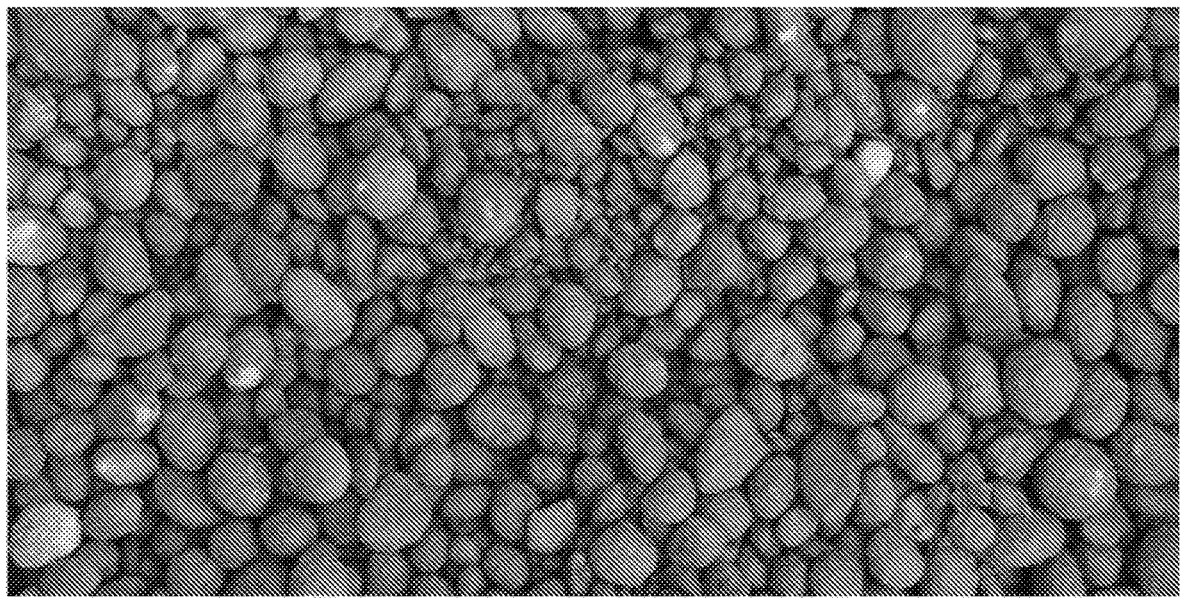
FIG. 4 is digital photograph of aggregate produced in Sample #6 of Table 1, in accordance with embodiments disclosed herein.
Figure 5:
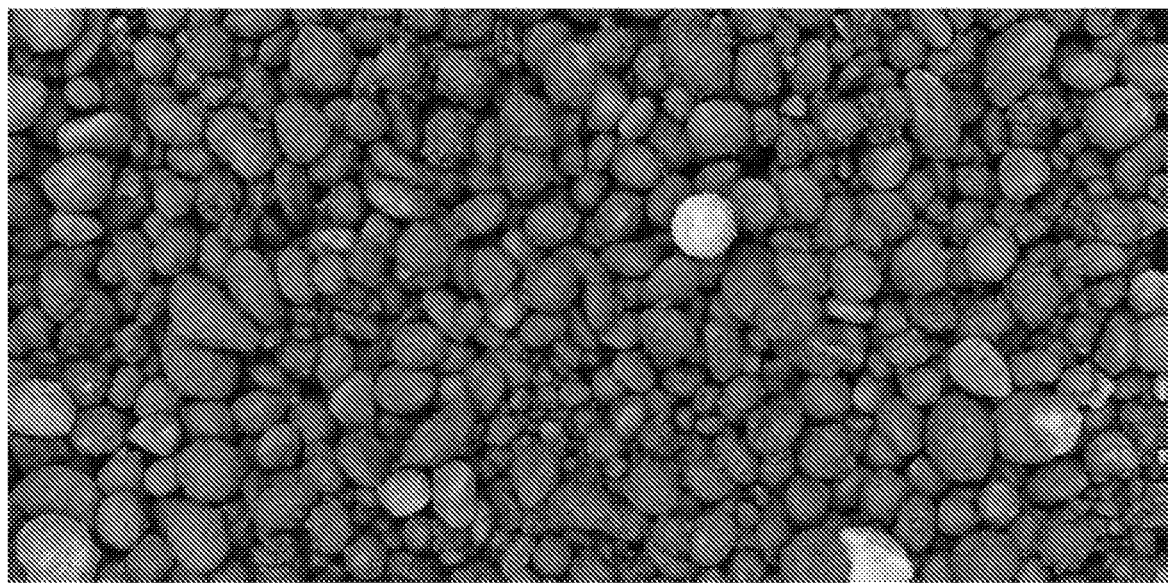
FIG. 5 is digital photograph of aggregate produced in Sample #9 of Table 1, accordance with embodiments disclosed herein.
Figure 6:
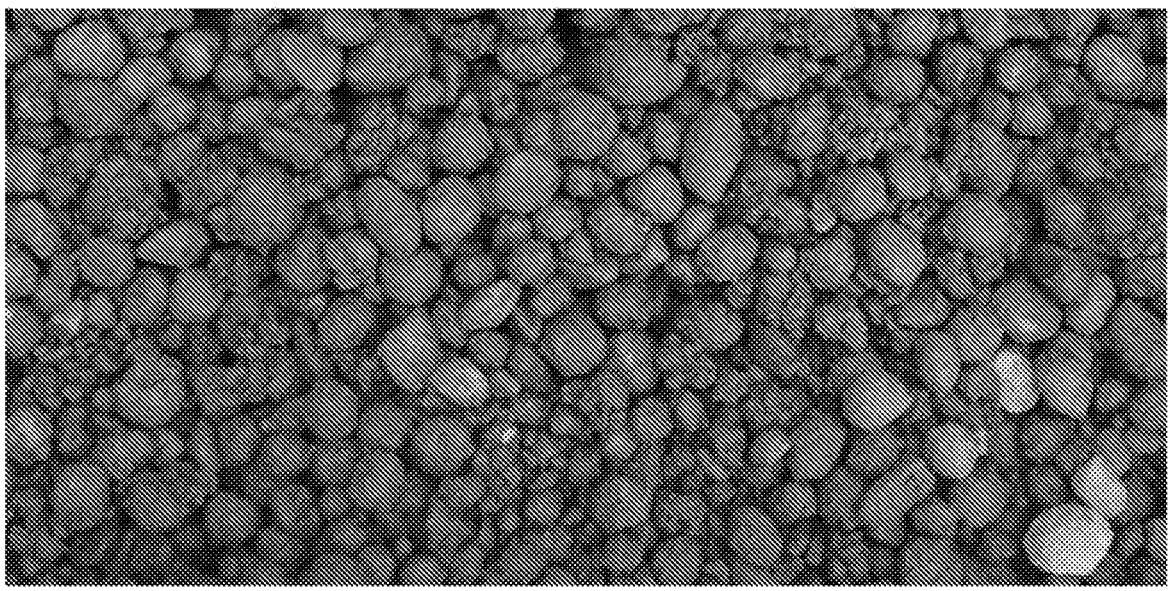
FIG. 6 is digital photograph of aggregate produced in Sample #11 of Table 1, in accordance with embodiments disclosed herein.

FIGS. 4, 5 and 6 show the granular material after it has been treated with shredded post-consumer news print and aluminum sulfate. In these figures the effect of aluminum sulfate dosage was investigated. The range of aluminum sulfate is 12.2-36.7 lbs/yd$^3$ and the dosage of shredded post-consumer news print was fixed at 24.5 lbs/yd$^3$. In all cases, the granular material appears to be a mixture of coarse and fine aggregate. Note, as the addition of aluminum sulfate is increased, the appearance of the coarse aggregate is smooth (FIG. 4) compared to the material treated with a lower level of aluminum sulfate (FIG. 6), indicating less adhesion of the paste/mortar fraction to the coarse material. The coarse aggregate in FIG. 4 appears rough in nature with small deposits of paste/mortar on the outer surface. FIG. 4 represents the material after being treated with 24.5 lbs/yd$^3$ of shredded post-consumer news print and 36.7 lbs/yd$^3$ of aluminum sulfate. FIG. 6 is granular material treated with the same dosage of shredded post-consumer news print but a lower dosage of aluminum sulfate, 12.2 lbs/yd$^3$.

Example 1

In this study the effect shredded post-consumer news print and concrete set accelerator (aluminum sulfate) on the conversion of plastic concrete to a granular material was investigated. In the first part of this study the effect of shredded post-consumer news print on the conversion of plastic concrete to a granular form was studied (sample numbers 2-4). The dosage range of shredded post-consumer news print used in the first study (sample numbers 1-4) was between 0 and 36.7 lbs/yd$^3$. When the concrete is in the plastic state, shredded post-consumer news print was manually added to the material and mixed using a stationary concrete mixer for about 3 minutes or until the material is converted to a granular form. At the dosage range investigated, 12.2 to 36.7 lbs/yd$^3$, the addition of shredded post-consumer news print transformed plastic concrete to a granular form as indicated by the zero slump measurements. The addition of shredded post-consumer news print also resulted in a decrease in the 28 day compressive strength relative to the reference mix. The 28 day compressive strength for the reference mix (no shredded post-consumer news print) is 4552 psi. At a cellulose fiber dosage of 36.7 lbs/yd$^3$, the 28 day strength decreases to 447 psi. The lower the compressive strength, the easier it is for the granular material to be broken up at a later time.

In the second study (sample numbers 5-11), the effect of a set accelerator, aluminum sulfate, in combination with shredded post-consumer news print on the conversion of plastic concrete to a granular form was investigated. The objective was to determine if the addition of a set accelerator would enhance the performance of the shredded post-consumer news print during the conversion process and also result in a weaker material over time. Plastic concrete was converted to a granular material by adding shredded post-consumer news print with the following characteristics: particle sized distribution as measured using sieve analysis: between 45 and 62% was retained on the mesh 20 sieve, between 12 and 21% was retained on the 40 mesh sieve. The ash content was between 3 and 20% and the moisture content was approximately 7%. The addition of shredded post-consumer news print and aluminum sulfate are given in the Table below together with the concrete mix design. Similar to the study above, the shredded post-consumer news print was manually added to the plastic concrete in a stationary batch mixer and then mixed between 15 and 45 rpm for about 3 minutes or until the plastic material was converted to a granular form. After the addition of fibers, a set accelerator, aluminum sulfate, was added and mixed for an additional 5 minutes. The dosage range of shredded post-consumer news print and aluminum sulfate were between 0 to 36.7 pounds per cubic yard of concrete. In all cases, the plastic material was converted to a granular form as indicated by the zero slump. Also, the compressive strength could not be measured since a single hardened mass could not be produced. This work showed that the addition of a set accelerator, aluminum sulfate, produced a granular material that was significantly weaker compared to the addition of only shredded post-consumer news print in the dosage range or addition rates investigated in this example. A later example will show that the same results can be achieved by increasing the dosage rate of fibers beyond 37 pounds per cubic yard of concrete. For example, at a shredded post-consumer news print dosage of 36.7 pounds per cubic yard of concrete, the compressive strength for material treated with only cellulose fiber was 447 psi (pounds per square inch when measured in accordance with ASTM C39/C39M, Standard Test Method for Compressive Strength of Cylindrical Concrete Specimens). The same material treated with the same dosage of fiber and aluminum sulfate broke apart before it could be measured.

In the following examples, to facilitate compressive strength measurements, the level of consolidation was significantly increased beyond what's called for in ASTM C31/C31M-15a, Standard Practice for Making and Curing Concrete Test Specimens in the Field. A vibration table in combination with a tamping rod were implemented to consolidate the granular material in compressive strength cylinder molds. The cylinder molds were 4 inches in diameter by 8 inches in length in accordance with ASTM C39/C39M, Standard Test Method for Compressive Strength of Cylindrical Concrete Specimens.

TABLE 1

| Number | Units | 1 | 2 | 3 | 4 | 5 | 6 |
|---|---|---|---|---|---|---|---|
| cement | lbs/yd$^3$ | 611 | 611 | 611 | 611 | 611 | 611 |
| coarse aggregate | lbs/yd$^3$ | 1775 | 1775 | 1775 | 1775 | 1775 | 1775 |
| sand | lbs/yd$^3$ | 1303 | 1303 | 1303 | 1303 | 1303 | 1303 |
| granular material | lbs/yd$^3$ | 0 | 0 | 0 | 0 | 0 | 0 |
| water | lbs/yd$^3$ | 318 | 318 | 318 | 318 | 318 | 318 |
| w/c | | 0.52 | 0.52 | 0.52 | 0.52 | 0.52 | 0.52 |
| fiber | type | | shredded post-consumer news print | post-consumer news print | post-consumer news print | post-consumer news print | post-consumer news print |
| | grams | | 162 | 324 | 486 | 162 | 324 |
| | lbs/yd$^3$ | | 12.2 | 24.5 | 36.7 | 12.2 | 24.5 |
| accelerator | Type | | | | | aluminum sulfate | aluminum sulfate |
| | grams | | | | | 162 | 162 |
| | lbs/yd$^3$ | | | | | 12.2 | 12.2 |
| polymer | type | | | | | | |
| | grams | | | | | | |
| | lbs/yd$^3$ | | | | | | |
| compressive strength (psi) | 1 day | 1723 | 1793 | 571 | 141 | 1240 | 362 |
| | 7 day | 3930 | 3422 | 984 | 337 | 2276 | 832 |
| | 28 day | 4552 | 4265 | 1388 | 447 | 2531 | 823 |
| granular | yes/no | no | yes | Yes | yes | Yes | yes |
| slump | inches | 8 | 0 | 0 | 0 | 0 | 0 |
| weight | grams | 20620 | 20210 | 18580 | 18350 | 20030 | 17450 |
| air | % | 1.8 | 3 | 7 | 8 | 4 | 4.5 |
| unit weight | kg/m$^3$ | 2387 | 2329 | 2099 | 2067 | 2304 | 1939 |
| | pcf | 149.0 | 145.4 | 131.0 | 129.0 | 143.8 | 121.0 |
| concrete temp. | °C. | 22.2 | 22.2 | 22.7 | 22.2 | 23.3 | 22.2 |

| Number | Units | 7 | 8 | 9 | 10 | 11 | 12 |
|---|---|---|---|---|---|---|---|
| cement | lbs/yd$^3$ | 611 | 611 | 611 | 611 | 611 | 611 |
| coarse aggregate | lbs/yd$^3$ | 1775 | 1775 | 1775 | 1775 | 1775 | 1775 |
| sand | lbs/yd$^3$ | 1303 | 1303 | 1303 | 1303 | 1303 | 1303 |
| granular material | lbs/yd$^3$ | 0 | 0 | 0 | 0 | 0 | 0 |
| water | lbs/yd$^3$ | 318 | 318 | 318 | 318 | 318 | 318 |
| w/c | | 0.52 | 0.52 | 0.52 | 0.52 | 0.52 | 0.52 |
| fiber | type | post-consumer news print | post-consumer news print | post-consumer news print | post-consumer news print | post-consumer news print | |
| | grams | 486 | 162 | 324 | 486 | 324 | |
| | lbs/yd$^3$ | 36.7 | 12.2 | 24.5 | 36.7 | 24.5 | |
| accelerator | Type | aluminum sulfate | aluminum sulfate | aluminum sulfate | aluminum sulfate | aluminum sulfate | |
| | grams | 162 | 324 | 324 | 324 | 486 | |
| | lbs/yd$^3$ | 12.2 | 24.5 | 24.5 | 24.5 | 36.7 | |
| polymer | type | | | | | | |
| | grams | | | | | | |
| | lbs/yd$^3$ | | | | | | |
| compressive strength (psi) | 1 day | 67 | 349 | 39 | 15 | 24 | 1839 |
| | 7 day | | | 662 | | | 3749 |
| | 28 day | | 945 | | | | 4941 |
| granular | yes/no | yes | yes | yes | yes | yes | no |
| slump | inches | 0 | 0 | 0 | 0 | 0 | 6.5 |
| weight | grams | 17070 | 18410 | 17420 | 16170 | 16240 | 20510 |
| air | % | 5 | 5 | 4 | 2.9 | 4.2 | 2 |
| unit weight | kg/m$^3$ | 1886 | 2075 | 1935 | 1759 | 1769 | 2372 |
| | pcf | 117.7 | 129.5 | 120.8 | 109.8 | 110.4 | 148.1 |
| concrete temp. | °C. | 23.3 | 22.7 | 26.6 | 25.5 | 27.7 | 22.2 |

Example 2

In this example, material made in Example 1, specifically sample numbers 6 and 9, were used to replace a fraction of the coarse aggregate, 10, 20 and 40%, of the reference mix (sample number 1). The granular material used to replace the aggregate was produced using 24.5 pounds per cubic yard of concrete of shredded post-consumer news print and 12.2 and 24.5 pounds per cubic yard of concrete of accelerator, aluminum sulfate, samples 6 and 9 respectively. The reference mix contains 1775 lbs/yd$^3$ of coarse aggregate. In sample number 2, 10% of the coarse aggregate, 178 lbs/yd$^3$, was replaced with the granular material produced in Example 1, specifically sample number 6. The total amount of coarse aggregate remains the same as the control, 1775 lbs/yd$^3$. In subsequent mixes, 20 and 40% of the coarse aggregate were replaced as indicated in Table 2 below. The plastic and hardened properties were measured and provided in Table 2 below. There is a decrease in compressive strength compared to the reference mix (number 1) as the fraction of coarse aggregate replacement increases. At 40% replacement, the strength decreases from 5031 psi to 4339 psi. When the replacement material was treated with more accelerator, the strength decrease was less, 4940 psi. One could argue that this difference is not significant. As the fraction of treated material in the mix increases, plastic air increases. At 40% aggregate replacement the plastic air increases from 2% to 2.9% (material treated with 12.2 lbs/yd³ aluminum sulfate) and 3.3% (material treated with 24.5 lbs/yd³ aluminum sulfate). The increase in air content could explain the decrease in strength.

TABLE 2

| Number | Units | 1 | 2 | 3 | 4 | 5 | 6 |
|---|---|---|---|---|---|---|---|
| cement | lbs/yd³ | 611 | 611 | 611 | 611 | 611 | 611 |
| coarse aggregate | lbs/yd³ | 1775 | 1775 | 1775 | 1775 | 1775 | 1775 |
| sand | lbs/yd³ | 1303 | 1303 | 1303 | 1303 | 1303 | 1303 |
| granular material | lbs/yd³ | 0 | 0 | 0 | 0 | 0 | 0 |
| water | lbs/yd³ | 318 | 318 | 318 | 318 | 318 | 318 |
| w/c | | 0.52 | 0.52 | 0.52 | 0.52 | 0.52 | 0.52 |
| fiber | type | | shredded post-consumer news print | shredded post-consumer news print | shredded post-consumer news print | shredded post-consumer news print | shredded post-consumer news print |
| | grams | | 162 | 324 | 486 | 162 | 324 |
| | lbs/yd³ | | 12.2 | 24.5 | 36.7 | 12.2 | 24.5 |
| accelerator | Type | | | | | aluminum sulfate | aluminum sulfate |
| | grams | | | | | 162 | 162 |
| | lbs/yd³ | | | | | 12.2 | 12.2 |
| polymer | type | | | | | | |
| | grams | | | | | | |
| | lbs/yd³ | | | | | | |
| compressive strength (psi) | 1 day | 1723 | 1793 | 571 | 141 | 1240 | 362 |
| | 7 day | 3930 | 3422 | 984 | 337 | 2276 | 832 |
| | 28 day | 4552 | 4265 | 1388 | 447 | 2531 | 823 |
| granular | yes/no | no | yes | Yes | Yes | yes | yes |
| slump | inches | 8 | 0 | 0 | 0 | 0 | 0 |
| weight | grams | 20620 | 20210 | 18580 | 18350 | 20030 | 17450 |
| air | % | 1.8 | 3 | 7 | 8 | 4 | 4.5 |
| unit weight | kg/m³ | 2387 | 2329 | 2099 | 2067 | 2304 | 1939 |
| | pcf | 149.0 | 145.4 | 131.0 | 129.0 | 143.8 | 121.0 |
| concrete temp. | ° C. | 22.2 | 22.2 | 22.7 | 22.2 | 23.3 | 22.2 |

| Number | Units | 7 | 8 | 9 | 10 | 11 | 12 |
|---|---|---|---|---|---|---|---|
| cement | lbs/yd³ | 611 | 611 | 611 | 611 | 611 | 611 |
| coarse aggregate | lbs/yd³ | 1775 | 1775 | 1775 | 1775 | 1775 | 1775 |
| sand | lbs/yd³ | 1303 | 1303 | 1303 | 1303 | 1303 | 1303 |
| granular material | lbs/yd³ | 0 | 0 | 0 | 0 | 0 | 0 |
| water | lbs/yd³ | 318 | 318 | 318 | 318 | 318 | 318 |
| w/c | | 0.52 | 0.52 | 0.52 | 0.52 | 0.52 | 0.52 |
| fiber | type | shredded post-consumer news print | shredded post-consumer news print | shredded post-consumer news print | shredded post-consumer news print | shredded post-consumer news print | |
| | grams | 486 | 162 | 324 | 486 | 324 | |
| | lbs/yd³ | 36.7 | 12.2 | 24.5 | 36.7 | 24.5 | |
| accelerator | Type | aluminum sulfate | aluminum sulfate | aluminum sulfate | aluminum sulfate | aluminum sulfate | |
| | grams | 162 | 324 | 324 | 324 | 486 | |
| | lbs/yd³ | 12.2 | 24.5 | 24.5 | 24.5 | 36.7 | |
| polymer | type | | | | | | |
| | grams | | | | | | |
| | lbs/yd³ | | | | | | |
| compressive strength (psi) | 1 day | 67 | 349 | 39 | 15 | 24 | 1839 |
| | 7 day | | | 662 | | | 3749 |
| | 28 day | | 945 | | | | 4941 |
| granular | yes/no | yes | yes | yes | yes | yes | no |
| slump | inches | 0 | 0 | 0 | 0 | 0 | 6.5 |
| weight | grams | 17070 | 18410 | 17420 | 16170 | 16240 | 20510 |
| air | % | 5 | 5 | 4 | 2.9 | 4.2 | 2 |
| unit weight | kg/m³ | 1886 | 2075 | 1935 | 1759 | 1769 | 2372 |
| | pcf | 117.7 | 129.5 | 120.8 | 109.8 | 110.4 | 148.1 |
| concrete temp. | ° C. | 23.3 | 22.7 | 26.6 | 25.5 | 27.37 | 22.2 |

Example 3

Plastic concrete was converted to a granular material by adding polymer fibers and aluminum sulfate. Sample number 1 is the reference mix. The next series, samples 2-4, use fibers made from polypropylene (commercial fibers, SINTA M and SINTA F polypropylene micro and fibrillated fibers sold by GCP Applied Technologies) in combination with aluminum sulfate. Fibers made from PVA in combination with aluminum sulfate were used in samples 5-7. The dosage rate for the fibers in both cases varied from 12.2 lbs/yd³ to 36.7 lbs/yd³. The accelerator dosage was fixed at 12.2 lbs/yd³. The process was the same as previously described. Fibers were manually added to the plastic concrete and mixed using a 3.0 cubic foot concrete mixer for approximately 3 minutes. To accelerate set, aluminum sulfate was then added and mixed for an additional 5 minutes. In all cases, material was converted to a granular form as indicated by the decrease in unit weight and zero slump. The concrete mix design together with the plastic and hardened properties are also given in Table 3 below. As previously observed with shredded post-consumer news print, as the dosage rate of polypropylene and polyvinyl alcohol fibers increase, the 28 day compressive strength decreases. For the case of polypropylene, at a dosage of 36.7 lbs/yd³ the strength decreases from 4855 psi to 1322 psi. The addition of polyvinyl alcohol fibers at a dosage of 36.7 lbs/yd³ results in a 28 day strength of 1336 psi, similar to values obtained for polypropylene. The values are higher compared for the same treatment using shredded post-consumer news print. From the first example, the 28 day strength for a granular material treated with 24.5 lbs/yd³ of shredded post-consumer news print and 12.2. lbs/yd³ of aluminum was 823 psi. From the previous study, the equivalent dosage resulted in a material that broke apart when removing from the mold and as a consequence a compressive strength measurement could not be made.

TABLE 3

| Number | Units | 1 | 2 | 3 | 4 | 5 | 6 | 7 |
|---|---|---|---|---|---|---|---|---|
| cement | lbs/yd³ | 611 | 611 | 611 | 611 | 611 | 611 | 611 |
| coarse aggregate | lbs/yd³ | 1775 | 1775 | 1775 | 1775 | 1775 | 1775 | 1775 |
| sand | lbs/yd³ | 1303 | 1303 | 1303 | 1303 | 1303 | 1303 | 1303 |
| granular material | lbs/yd³ | 0 | 0 | 0 | 0 | 0 | 0 | 0 |
| water | lbs/yd³ | 318 | 318 | 318 | 318 | 318 | 318 | 318 |
| w/c | | 0.52 | 0.52 | 0.52 | 0.52 | 0.52 | 0.52 | 0.52 |
| fiber | type | | polypropylene fibers | polypropylene fibers | polypropylene fibers | pva fibers | pva fibers | pva fibers |
| | grams | | 162 | 324 | 486 | 162 | 324 | 486 |
| | lbs/yd³ | | 12.2 | 24.5 | 36.7 | 12.2 | 24.5 | 36.7 |
| accelerator | Type | | aluminum sulfate | aluminum sulfate | aluminum sulfate | aluminum sulfate | aluminum sulfate | aluminum sulfate |
| | grams | | 162 | 162 | 162 | 162 | 162 | 162 |
| | lbs/yd³ | | 12.2 | 12.2 | 12.2 | 12.2 | 12.2 | 12.2 |
| polymer | type | | | | | | | |
| | grams | | | | | | | |
| | lbs/yd³ | | | | | | | |
| compressive strength (psi) | 1 day | 1797 | 1994 | 906 | 803 | 1572 | 975 | 706 |
| | 7 day | 3798 | 3588 | 1890 | 937 | 2662 | 1656 | 1304 |
| | 28 day | 4855 | 4633 | 1994 | 1322 | 2650 | 2384 | 1336 |
| granular | yes/no | no | no | yes | yes | yes | yes | yes |
| slump | inches | 8.25 | 0.25 | 0 | 0 | 0 | 0 | 0 |
| weight | grams | 20610 | 20470 | 19840 | 18900 | 20200 | 19210 | 18960 |
| air | % | 1.7 | 0 | 0 | 0 | 0 | 0 | 0 |
| unit weight | kg/m³ | 2386 | 2366 | 2277 | 2144 | 2328 | 2188 | 2153 |
| | pcf | 149.0 | 147.7 | 142.1 | 133.8 | 145.3 | 136.6 | 134.4 |
| concrete temp. | ° C. | 22.2 | 24.4 | 25.5 | 24.4 | 24.4 | 24.4 | 24.4 |

Example 4

In this example, material made in Example 1, specifically sample number 11, was used to replace a fraction of the coarse aggregate, 10, 20 and 40%, i.e., samples 2-4. Sample 11 in Example 1 used 24.5 lbs/yd$^3$ of cellulose fiber and 36.7 lbs/yd$^3$ of set accelerator, aluminum sulfate. The effect on plastic and hardened properties were measured and given in Table 4 below. There's a slight decrease in the 28 day compressive strength relative to the reference mix. At 40% coarse aggregate replacement, the 28 day strength is 4887 psi, which is 339 psi less than the reference mix. As the fraction of treated material increases in the mix, plastic air increases. The reference mix contains 1.9% plastic air. At 40% replacement of the coarse aggregate the plastic air increases to 2.6%.

Samples 5-7 are looking at the effect on concrete plastic properties with the addition of 24.5 lbs/yd$^3$ of shredded post-consumer news print and a variation in the addition rate of aluminum sulfate, from 12.2 to 36.7 lbs/yd$^3$. As previously demonstrated, the addition of shredded post-consumer news print and aluminum sulfate can convert plastic concrete to a granular form. In this case, the dosage rate of shredded post-consumer news print is fixed at 24.5 lbs/yd$^3$ and the dosage rate of aluminum sulfate is varied between 12.2 and 36.7 lbs/yd$^3$. As previously demonstrated, the addition of shredded post-consumer news print and aluminum sulfate in the dosage range between 12.2 and 36.7 lbs/yd$^3$ significantly reduces the 28 day strength making it easier to manage granular material as a function of time. For example, at an accelerator dosage of 36.7 lbs/yd$^3$ the compressive strength decreases from 5226 psi for the reference mix to 381 psi. The last sample, number 8, is the treatment of plastic concrete with a competitive product called RECON Zero, from Mapei. RECON Zero is a two-component system comprised of a super absorbent polymer (crossed linked sodium polyacrylic polymer) and set accelerator, aluminum sulfate. The dosage of polymer and accelerator are relatively low compared to the use of cellulose fiber and set accelerator used in previous examples. The polymer dosage is 0.8 lbs/yd$^3$ and the set accelerator is 10.1 lbs/yd$^3$. RECON Zero also results in a granular material with a concomitant decrease in 28 day compressive strength relative to the reference mix. For this case, the 28 day strength decreases to 447 psi.

TABLE 4

| Number | | Units | 1 | 2 | 3 | 4 | 5 | 6 | 7 | 8 |
|---|---|---|---|---|---|---|---|---|---|---|
| cement | | lbs/yd$^3$ | 611 | 611 | 611 | 611 | 611 | 611 | 611 | 611 |
| coarse aggregate | | lbs/yd$^3$ | 1775 | 1597.5 | 1420 | 1065 | 1775 | 1775 | 1775 | 1775 |
| sand | | lbs/yd$^3$ | 1303 | 1303 | 1303 | 1303 | 1303 | 1303 | 1303 | 1303 |
| granular material | | lbs/yd$^3$ | 0 | 178 | 355 | 710 | 0 | 0 | 0 | 0 |
| water | | lbs/yd$^3$ | 318 | 318 | 318 | 318 | 318 | 318 | 318 | 318 |
| w/c | | | 0.52 | 0.52 | 0.52 | 0.52 | 0.52 | 0.52 | 0.52 | 0.52 |
| fiber | type | | | shredded post-consumer news print | shredded post-consumer news print | shredded post-consumer news print | shredded post-consumer news print | shredded post-consumer news print | shredded post-consumer news print | |
| | grams | | | 324 | 324 | 324 | 324 | 324 | 324 | |
| | lbs/yd$^3$ | | | 24.5 | 24.5 | 24.5 | 24.5 | 24.5 | 24.5 | |
| accelerator | Type | | | aluminum sulfate | aluminum sulfate | aluminum sulfate | aluminum sulfate | aluminum sulfate | aluminum sulfate | aluminum sulfate |
| | grams | | | 486 | 486 | 486 | 162 | 324 | 486 | 133 |
| | lbs/yd$^3$ | | | 36.7 | 36.7 | 36.7 | 12.2 | 24.5 | 36.7 | 10.1 |
| polymer | type | | | | | | | | | sap |
| | grams | | | | | | | | | 11.1 |
| | lbs/yd$^3$ | | | | | | | | | 0.8 |
| compressive strength (psi) | 1 day | | 1946 | 1979 | 1771 | 1830 | 402 | 412 | 218 | 283 |
| | 7 day | | 3510 | 3795 | 3423 | 3514 | 796 | 577 | 286 | 522 |
| | 28 day | | 5226 | 4906 | 4844 | 4887 | 907 | 903 | 381 | 447 |
| granular | yes/no | | no | No | no | no | yes | yes | yes | yes |
| slump | | inches | 8.25 | 7.5 | 8 | 8.25 | 0 | 0 | 0 | 0 |
| weight | | grams | 20590 | 20420 | 20320 | 20030 | 16460 | 16280 | 15820 | 16470 |
| air | | % | 1.9 | 2 | 2.1 | 2.6 | 0 | 0 | 0 | 0 |
| unit weight | | kg/m$^3$ | 2383 | 2359 | 2345 | 2304 | 1800 | 1774 | 1709 | 1801 |
| | | pcf | 148.8 | 147.3 | 146.4 | 143.8 | 112.4 | 110.7 | 106.7 | 112.4 |
| concrete temp. | | °C. | 23.3 | 23.3 | 23.3 | 23.3 | 25.5 | 27.7 | 28.8 | 27.2 |

Example 5

Batch Number 17247

In this example, three small studies were carried out. In the first study, samples 2-3, the effect of polypropylene fibers (commercial fibers, SINTA M and SINTA F polypropylene micro and fibrillated fibers sold by GCP Applied Technologies) without the addition of aluminum sulfate was investigated. At 12.2 lbs/yd$^3$, the addition of polypropylene fibers could not convert plastic concrete to a granular form. At 24.5 lbs/yd$^3$, the addition of polypropylene fibers was able to transform plastic concrete to a granular form. The decrease in the 28 day compressive strength was small compared to the use of shredded post-consumer news print at the same dosage. At 24.5 lbs/yd$^3$ of fibers the compressive strength for concrete treated with cellulose was 1388 psi compared to 4844 psi for concrete treated with polypropylene fibers.

In the second study, sample number 4-6, the dosage of polypropylene fibers was fixed at 12.2 lbs/yd$^3$ and the dosage rate of aluminum sulfate was varied between 12.2 and 36.7 lbs/yd$^3$. In all three cases, plastic concrete was converted to a granular form as indicated by the zero slump, decrease in unit weight and compressive strength. The addition of accelerator in excess of 12.2 lbs/yd$^3$ results in a significant decrease in 28 day strength. At a dosage of 24.5 lbs/yd$^3$, the 28 day strength decreases from 5226 psi to 907 psi.

In the last study, in addition to the shredded post-consumer news print and aluminum sulfate, a super absorbent polymer (SAP), Hysorb 8600 from BASF and CoolTie AgSAP from M2Polymer, was added to determine if the granular properties of the material improves, i.e., is weaker when the SAP is introduced. The role of the super absorbent polymer is to absorb water from the system facilitating the conversion of plastic concrete to a granular material. The dosage rate or dependence of the SAP was studied between 0.4 and 1.7 lbs/yd$^3$. In the absence of SAP, the 28 day strength for concrete treated with cellulose fiber and accelerator at a dosage of 12.2 lbs/yd$^3$ was 2531 psi. The addition of 0.4 lbs/yd$^3$ of SAP reduces the 28 day strength to 381 psi. Results indicate that the 28 day strength is independent of SAP dosage in the range investigated. At a dosage of 1.7 lbs/yd$^3$, the 28 day strength is 447 psi which is higher than the value measured at a dosage of 0.4 lbs/yd$^3$.

TABLE 5

| Number | | 1 | 2 | 3 | 4 | 5 | 6 | 7 | 8 | 9 |
|---|---|---|---|---|---|---|---|---|---|---|
| cement | lbs/yd$^3$ | 611 | 611 | 611 | 611 | 611 | 611 | 611 | 611 | 611 |
| coarse aggregate | lbs/yd$^3$ | 1775 | 1775 | 1775 | 1775 | 1775 | 1775 | 1775 | 1775 | 1775 |
| sand | lbs/yd$^3$ | 1303 | 1303 | 1303 | 1303 | 1303 | 1303 | 1303 | 1303 | 1303 |
| granular material | lbs/yd$^3$ | 0 | 0 | 0 | 0 | 0 | 0 | 0 | 0 | 0 |
| water | lbs/yd$^3$ | 318 | 318 | 318 | 318 | 318 | 318 | 318 | 318 | 318 |
| w/c | | 0.52 | 0.52 | 0.52 | 0.52 | 0.52 | 0.52 | 0.52 | 0.52 | 0.52 |
| fiber | type | | polypropylene fibers | polypropylene fibers | polypropylene fibers | polypropylene fibers | polypropylene fibers | shredded post-consumer news print | shredded post-consumer news print | shredded post-consumer news print |
| | grams | | 162 | 324 | 162 | 162 | 162 | 162 | 162 | 162 |
| | lbs/yd$^3$ | | 12.2 | 24.5 | 12.2 | 12.2 | 12.2 | 12.2 | 12.2 | 12.2 |
| accelerator | Type | | | | aluminum sulfate | aluminum sulfate | aluminum sulfate | aluminum sulfate | aluminum sulfate | aluminum sulfate |
| | grams | | | | 162 | 324 | 486 | 162 | 162 | 162 |
| | lbs/yd$^3$ | | | | 12.2 | 24.5 | 36.7 | 12.2 | 12.2 | 12.2 |
| polymer | type | | | | | | | Sap | sap | sap |
| | grams | | | | | | | 5.6 | 11.1 | 22.3 |
| | lbs/yd$^3$ | | | | | | | 0.4 | 0.8 | 1.7 |
| compressive strength (psi) | 1 day | 1443 | 1488 | 1108 | 1566 | 1192 | 762 | 399 | 254 | 141 |
| | 7 day | 4319 | 3386 | 2204 | 3674 | 3452 | 1709 | 754 | 466 | 409 |
| | 28 day | 5226 | 4906 | 4844 | 4887 | 907 | 903 | 381 | 447 | 447 |
| granular | yes/no | no | no | yes | yes | yes | yes | Yes | yes | yes |
| slump | inches | 9 | 1.25 | 0 | 0 | 0 | 0 | 0 | 0 | 0 |
| weight | grams | 20360 | 19560 | 18410 | 18420 | 18060 | 17600 | 16490 | 16600 | 16180 |
| air | | 2.6 | 0 | 0 | 0 | 0 | 0 | 0 | 0 | 0 |
| unit weight | kg/m$^3$ | 2351 | 2238 | 2075 | 2077 | 2026 | 1961 | 1804 | 1819 | 1760 |
| | Pcf | 146.8 | 139.7 | 129.5 | 129.7 | 126.5 | 122.4 | 112.6 | 113.6 | 109.9 |
| concrete temp. | °C. | 21.1 | 22.7 | 22.7 | 22.2 | 23.3 | 27.2 | 24.4 | 23.8 | 23.3 |

Example 6

In the first study, sample numbers 2-4, treated material was used to replace coarse aggregate in the reference mix (sample number 1). The treated material was made in Example 4, sample number 7. The level of replacement was similar to previous studies, 10, 20 and 40% of the coarse aggregate (as shown in the table below). Unlike in some of the previous studies, the compressive strength did not change significantly. The 28 day strength for the reference mix was 4977 psi. At 40% replacement, the 28 day strength was 4949 psi. The air did increase slightly as the amount of treated material in the mix increased. The air increased from 1.7 to 2.9%. The shredded post-consumer news print and aluminum sulfate content in the treated material was approximately 24.5 lbs/yd$^3$ and 36.7 lbs/yd$^3$ respectively. One reason why the difference in compressive strength was not significant could be due to the increased level of accelerator, aluminum sulfate.

In the second study, sample numbers 5-6, treated material was used to replace coarse aggregate in the reference mix (sample number 1). The treated material was made in Example 4, sample number 8. In this study the level of coarse aggregate replacement was approximately 10 and 20%. Similar to the first study, there was no significant effect on the concrete hardened properties. Compressive strength of the treated material was comparable to the reference mix. Unlike mixes containing shredded post-consumer news print, there was a reduction in air as the percent replacement increased. However, the plastic air was still higher than the reference mix. Example 4, sample number 8 was treated using a commercially available product called RECON Zero manufactured by Mapei. RECON Zero is a two-part system comprised of a super absorbent polymer (sodium polyacrylate, part A) and a set accelerator (aluminum sulfate, part B). The relative dosages are given or provided in the examples (4 and 6).

The last two examples, 7 & 8, were simply replicates of previous studies.

TABLE 6

| Number | | 1 | 2 | 3 | 4 | 5 | 6 | 7 | 8 |
|---|---|---|---|---|---|---|---|---|---|
| cement | lbs/yd$^3$ | 611 | 611 | 611 | 611 | 611 | 611 | 611 | 611 |
| coarse aggregate | lbs/yd$^3$ | 1775 | 1597.5 | 1420 | 1065 | 1597.5 | 1420 | 1775 | 1775 |
| sand | lbs/yd$^3$ | 1303 | 1303 | 1303 | 1303 | 1303 | 1303 | 1303 | 1303 |
| granular material | lbs/yd$^3$ | 0 | 178 | 355 | 710 | 178 | 355 | 0 | 0 |
| water | lbs/yd$^3$ | 318 | 318 | 318 | 318 | 318 | 318 | 318 | 318 |
| w/c | | 0.52 | 0.52 | 0.52 | 0.52 | 0.52 | 0.52 | 0.52 | 0.52 |
| fiber | type | | shredded post-consumer news print | shredded post-consumer news print | shredded post-consumer news print | | | | shredded post-consumer news print |
| | grams | | 324 | 324 | 324 | | | | 324 |
| | lbs/yd$^3$ | | 24.5 | 24.5 | 24.5 | | | | 24.5 |
| accelerator | type | | aluminum sulfate | aluminum sulfate | aluminum sulfate | aluminum sulfate | aluminum sulfate | aluminum sulfate | aluminum sulfate |
| | grams | | 486 | 486 | 486 | 133 | 133 | 133 | 486 |
| | lbs/yd$^3$ | | 36.7 | 36.7 | 36.7 | 10.1 | 10.1 | 10.1 | 36.7 |
| polymer | type | | | | | sap | Sap | sap | |
| | grams | | | | | 11.1 | 11.1 | 11.1 | |
| | lbs/yd$^3$ | | | | | 0.8 | 0.8 | 0.8 | |
| compressive strength (psi) | 1 day | 1952 | 2169 | 1983 | 2168 | 1753 | 2103 | 478 | 128 |
| | 7 day | 3963 | 3997 | 3902 | 3955 | 3874 | 3942 | 731 | 221 |
| | 28 day | 4977 | 5052 | 5106 | 4949 | 5083 | 5128 | 1340 | 555 |
| granular | yes/no | no | no | no | no | no | No | yes | yes |
| slump | inches | 8.25 | 8 | 5.5 | 3.75 | 8.25 | 5.75 | 0 | 0 |
| weight | grams | 20620 | 20510 | 20390 | 20050 | 20420 | 20510 | 18230 | 16780 |
| air | % | 1.7 | 2 | 2.4 | 2.9 | 2.4 | 1.9 | 0 | 0 |
| unit weight | kg/m$^3$ | 2387 | 2372 | 2355 | 2307 | 2359 | 2372 | 2050 | 1845 |
| | pcf | 149.0 | 148.1 | 147.0 | 144.0 | 147.3 | 148.1 | 128.0 | 115.2 |
| concrete temp. | °C. | 22.7 | 22.7 | 22.7 | 22.7 | 22.7 | 23.3 | 23.8 | 27.2 |

Example 7

In the first study, sample numbers 2-4, treated material was used to replace coarse aggregate in the reference mix (sample number 1). The treated material was made in Example 6, sample number 7. The level of replacement was similar to previous studies, 10, 20 and 40% of the coarse aggregate (as shown in the table below). Unlike in some of the previous studies, the compressive strength did not change significantly. The air did increase slightly as the amount of treated material in the mix increased. This was not observed at the lower dosage previously studied (Example 6). In this study the treated material used to replace the coarse aggregate was made using a commercially available product called RECON Zero manufactured by Mapei. RECON Zero is a two-part system comprised of a super absorbent polymer (sodium polyacrylate, part A) and a set accelerator (aluminum sulfate, part B). The dosage rates of part A and part B are 0.8 and 10.1 lbs/yd$^3$ respectively.

In the second study, sample numbers 5-7, treated material was used to replace coarse aggregate in the reference mix (sample number 1). The treated material was made in Example 6, sample number 8. The material in Example 6, sample number 8 was treated using shredded post-consumer news print and aluminum sulfate. The level of replacement was similar to previous studies, 10, 20 and 40% of the coarse aggregate (as shown in the table below). Unlike in some of the previous studies, the compressive strength did not change significantly. The air did increase slightly as the amount of treated material in the mix increased. The cellulose and aluminum sulfate content in the treated material was approximately 24.5 lbs/yd$^3$ and 36.7 lbs/yd$^3$ respectively. One reason why the difference in compressive strength was not significant could be due to the increased level of accelerator, aluminum sulfate.

In the third study, the use of cellulose fiber and accelerator to convert plastic concrete to a granular material was repeated. The dosage rate of cellulose fiber was fixed at 24.5 lbs/yd$^3$. The dosage rate of aluminum sulfate was between 12.2 and 36.7 lbs/yd$^3$.

The last two examples, 7 & 8, were simply replicates of previous studies.

TABLE 7

| Number | | 1 | 2 | 3 | 4 | 5 | 6 | 7 | 8 | 9 | 10 |
|---|---|---|---|---|---|---|---|---|---|---|---|
| cement | lbs/yd$^3$ | 611 | 611 | 611 | 611 | 611 | 611 | 611 | 611 | 611 | 611 |
| coarse aggregate | lbs/yd$^3$ | 1775 | 1597.5 | 1420 | 1065 | 1597.5 | 1420 | 1065 | 1775 | 1775 | 1775 |
| sand | lbs/yd$^3$ | 1303 | 1303 | 1303 | 1303 | 1303 | 1303 | 1303 | 1303 | 1303 | 1303 |
| granular material | lbs/yd$^3$ | 0 | 178 | 355 | 710 | 178 | 355 | 710 | 0 | 0 | 0 |
| water | lbs/yd$^3$ | 318 | 318 | 318 | 318 | 318 | 318 | 318 | 318 | 318 | 318 |
| w/c | | 0.52 | 0.52 | 0.52 | 0.52 | 0.52 | 0.52 | 0.52 | 0.52 | 0.52 | 0.52 |
| fiber | type | | | | | shredded post-consumer news print | shredded post-consumer news print | shredded post-consumer news print | shredded post-consumer news print | shredded post-consumer news print | shredded post-consumer news print |
| | grams | | | | | 324 | 324 | 324 | 324 | 324 | 324 |
| | lbs/yd$^3$ | | | | | 24.5 | 24.5 | 24.5 | 24.5 | 24.5 | 24.5 |
| accelerator | type | | aluminum sulfate | aluminum sulfate | aluminum sulfate | aluminum sulfate | aluminum sulfate | aluminum sulfate | aluminum sulfate | aluminum sulfate | aluminum sulfate |
| | grams | | 133.1 | 133.1 | 133.1 | 486 | 486 | 486 | 162 | 324 | 486 |
| | lbs/yd$^3$ | | 10.1 | 10.1 | 10.1 | 36.7 | 36.7 | 36.7 | 12.2 | 24.5 | 36.7 |
| polymer | type | | sap | sap | sap | | | | | | |
| | grams | | 11.1 | 11.1 | 11.1 | | | | | | |
| | lbs/yd$^3$ | | 0.8 | 0.8 | 0.8 | | | | | | |
| compressive strength (psi) | 1 day | 2041 | 2021 | 1817 | 1986 | 1704 | 1813 | 1873 | 753 | 354 | 309 |
| | 7 day | 4098 | 4054 | 3896 | 4194 | 3643 | 3975 | 3847 | 1458 | 730 | 655 |
| | 28 day | 5296 | 5590 | 5193 | 5675 | 4808 | 5094 | 4664 | 1773 | 684 | 743 |
| granular | yes/no | no | no | no | no | no | no | no | yes | yes | yes |
| slump | Inches | 5.25 | 6.25 | 6.25 | 5.5 | 8 | 6.25 | 3.5 | 0 | 0 | 0 |
| weight | grams | 19840 | 19710 | 19770 | 19400 | 19750 | 19580 | 19310 | 16950 | 16880 | 15990 |
| air | % | 2.1 | 2.1 | 2.2 | 2.5 | 2.1 | 2.6 | 3.4 | 0 | 0 | 0 |
| unit weight | kg/m$^3$ | 2277 | 2259 | 2267 | 2215 | 2264 | 2240 | 2202 | 1869 | 1859 | 1733 |
| | pcf | 142.1 | 141.0 | 141.5 | 138.3 | 141.3 | 139.8 | 137.5 | 116.7 | 116.1 | 108.2 |
| concrete temp. | °C. | 21.1 | 21.6 | 22.2 | 21.1 | 21.6 | 21.6 | 22.2 | 23.3 | 25.5 | 26.1 |

Example 8

In this example, two studies were carried out using a fixed dosage rate of shredded post-consumer news print and aluminum sulfate. The effect of dosage rate on the performance or conversion of plastic concrete to a granular form was studied using two different protocols. In the first study (sample numbers 2-4) the addition of materials was sequential. The super absorbent polymer was added first and mixed for three minutes, followed by the addition of shredded post-consumer news print and mixed for the same amount of time, 3 minutes. After the mixing of cellulose fiber, the set accelerator, aluminum sulfate, was added and mixed for 5 minutes. In the second study (sample numbers 5-7), all materials were blended and added simultaneously. In both cases the performance, plastic and hardened properties were similar indicating that the addition sequence of raw materials has no effect on the conversion of plastic concrete to a granular form.

TABLE 8

| Number | | 1 | 2 | 3 | 4 | 5 | 6 | 7 |
|---|---|---|---|---|---|---|---|---|
| cement | lbs/yd$^3$ | 611 | 611 | 611 | 611 | 611 | 611 | 611 |
| coarse aggregate | lbs/yd$^3$ | 1775 | 1775 | 1775 | 1775 | 1775 | 1775 | 1775 |
| sand | lbs/yd$^3$ | 1303 | 1303 | 1303 | 1303 | 1303 | 1303 | 1303 |
| granular material | lbs/yd$^3$ | 0 | 0 | 0 | 0 | 0 | 0 | 0 |
| water | lbs/yd$^3$ | 318 | 318 | 318 | 318 | 318 | 318 | 318 |
| w/c | | 0.52 | 0.52 | 0.52 | 0.52 | 0.52 | 0.52 | 0.52 |
| fiber | type | | shredded post-consumer news print | shredded post-consumer news print | shredded post-consumer news print | shredded post-consumer news print | shredded post-consumer news print | shredded post-consumer news print |
| | grams | | 162 | 162 | 162 | 162 | 162 | 162 |
| | lbs/yd$^3$ | | 12.2 | 12.2 | 12.2 | 12.2 | 12.2 | 12.2 |
| accelerator | type | | aluminum sulfate | aluminum sulfate | aluminum sulfate | aluminum sulfate | aluminum sulfate | aluminum sulfate |
| | grams | | 162 | 162 | 162 | 162 | 162 | 162 |
| | lbs/yd$^3$ | | 12.2 | 12.2 | 12.2 | 12.2 | 12.2 | 12.2 |
| polymer | type | | sodium polyacrylate | sodium polyacrylate | sodium polyacrylate | sodium polyacrylate | sodium polyacrylate | sodium polyacrylate |
| | grams | | 5.5 | 11 | 22 | 5.5 | 11 | 22 |
| | lbs/yd$^3$ | | 0.4 | 0.8 | 1.7 | 0.4 | 0.8 | 1.7 |
| compressive strength (psi) | 1 day | 1738 | 267 | 86 | 83 | 258 | 136 | 107 |
| | 7 day | 3756 | 545 | 185 | 219 | 397 | 273 | 135 |
| | 28 day | 4817 | 992 | 218 | 425 | 532 | 369 | 237 |
| granular | yes/no | no | yes | yes | yes | Yes | yes | yes |
| slump | inches | 8.25 | 0 | 0 | 0 | 0 | 0 | 0 |
| weight | grams | 20680 | 18400 | 16980 | 17310 | 18450 | 16800 | 17700 |
| air | % | 1.3 | 0 | 0 | 0 | 0 | 0 | 0 |
| unit weight | kg/m$^3$ | 2396 | 2074 | 1873 | 1920 | 2081 | 1848 | 1975 |
| | pcf | 149.6 | 129.5 | 116.9 | 119.9 | 129.9 | 115.4 | 123.3 |
| concrete temp. | ° C. | 25 | 26.1 | 25.6 | 25.6 | 25.6 | 25.6 | 25.6 |

Note:
the difference between samples 2, 3, 4 and 5, 6, 7 is that for the case of 5, 6, 7 the sap (sodium polyacrylate), accelerator (aluminum sulfate) and shredded post-consumer news print were pre-blended before addition.

Example 9

In this example, two studies were carried out to determine the effect of accelerator dosage rate on the conversion of plastic concrete to a granular form at a fixed dosage of shredded post-consumer news print. In the first study, the dosage rate of shredded post-consumer news print was fixed at 12.2 lbs/yd$^3$. The dosage rates of set accelerator investigated were 12.2, 24.5 and 37.7 lbs/yd$^3$. In the second study, a similar investigation was carried out except in this case the dosage of cellulose fiber was increased from 12.2 to 24.5 lbs/yd$^3$. The dosages of aluminum sulfate remained the same. The most significant difference is in the compressive strength. For the same dosage of aluminum sulfate, the addition of shredded post-consumer news print results in a significant decrease in compressive strength. For example, at fixed accelerator dosage of 12.2 lbs/yd$^3$, when the dosage in shredded post-consumer news print increases from 12.2 and 24.5 lbs/yd$^3$ the 28 day strength decreases from 3870 to 483 psi. The addition of shredded post-consumer news print significantly decreases the compressive strength making it easier to breakup.

TABLE 9

| Number | | 1 | 2 | 3 | 4 | 5 | 6 | 7 |
|---|---|---|---|---|---|---|---|---|
| cement | lbs/yd$^3$ | 611 | 611 | 611 | 611 | 611 | 611 | 611 |
| coarse aggregate | lbs/yd$^3$ | 1775 | 1775 | 1775 | 1775 | 1775 | 1775 | 1775 |
| sand | lbs/yd$^3$ | 1303 | 1303 | 1303 | 1303 | 1303 | 1303 | 1303 |
| granular material | lbs/yd$^3$ | 0 | 0 | 0 | 0 | 0 | 0 | 0 |
| water | lbs/yd$^3$ | 318 | 318 | 318 | 318 | 318 | 318 | 318 |
| w/c | | 0.52 | 0.52 | 0.52 | 0.52 | 0.52 | 0.52 | 0.52 |
| fiber | type | | shredded post-consumer news print | shredded post-consumer news print | shredded post-consumer news print | shredded post-consumer news print | shredded post-consumer news print | shredded post-consumer news print |
| | grams | | 162 | 162 | 162 | 324 | 324 | 324 |
| | lbs/yd$^3$ | | 12.2 | 12.2 | 12.2 | 24.5 | 24.5 | 24.5 |
| accelerator | type | | aluminum sulfate | aluminum sulfate | aluminum sulfate | aluminum sulfate | aluminum sulfate | aluminum sulfate |
| | grams | | 162 | 324 | 486 | 162 | 324 | 486 |
| | lbs/yd$^3$ | | 12.2 | 24.5 | 36.7 | 12.2 | 24.5 | 36.7 |
| polymer | type | | | | | | | |
| | grams | | | | | | | |
| | lbs/yd$^3$ | | | | | | | |
| compressive strength (psi) | 1 day | 1386 | 1398 | 474 | 218 | 162 | 275 | 23 |
| | 7 day | 3151 | 2762 | 659 | 338 | 358 | 486 | 66 |
| | 28 day | 4790 | 3870 | 905 | 485 | 483 | 517 | 129 |
| granular | yes/no | no | yes | yes | yes | yes | yes | yes |
| slump | inches | 6.5 | 0 | 0 | 0 | 0 | 0 | 0 |
| weight | grams | 20420 | 20100 | 18400 | 17160 | 17380 | 17000 | 17270 |
| air | % | 1.8 | 0 | 0 | 0 | 0 | 0 | 0 |
| unit weight | kg/m$^3$ | 2359 | 2314 | 2074 | 1899 | 1930 | 1876 | 1914 |
| | pcf | 147.3 | 144.5 | 129.5 | 118.6 | 120.5 | 117.1 | 119.5 |
| concrete temp. | ° C. | 23.3 | 25.6 | 27.2 | 27.2 | 26.7 | 26.7 | 27.8 |

Example 10

In the first study, sample numbers 2-4, treated material was used to replace coarse aggregate in the reference mix (sample number 1). The treated material was made in Example 9, sample number 4. The level of replacement was similar to previous studies, 10, 20 and 40% of the coarse aggregate (as shown in the table below). Similar to previous studies the compressive strength decreased slightly with a concomitant increase in plastic air. The material used to replace the coarse aggregate was treated with shredded post-consumer news print and aluminum sulfate at 12.2 and 36.7 lbs/yd$^3$, respectively.

In the second study, sample numbers 5-7, treated material was used to replace coarse aggregate in the reference mix (sample number 1). The treated material was made in Example 6, sample number 7. The level of replacement was similar to previous studies, 10, 20 and 40% of the coarse aggregate (as shown in the table below). Similar to previous studies the compressive strength decreased slightly with a concomitant increase in plastic air. The material used to replace the coarse aggregate was treated with shredded post-consumer news print and aluminum sulfate at 24.5 and 36.7 lbs/yd$^3$, respectively. In this case, the increase in air was higher compared to the first study indicating that as the dosage rate of fibers increases so does the plastic air when the material is reused as aggregate.

TABLE 10

| Number | | 1 | 2 | 3 | 4 | 5 | 6 | 7 |
|---|---|---|---|---|---|---|---|---|
| cement | lbs/yd$^3$ | 611 | 611 | 611 | 611 | 611 | 611 | 611 |
| coarse aggregate | lbs/yd$^3$ | 1775 | 1597.5 | 1420 | 1065 | 1597.5 | 1420 | 1065 |
| sand | lbs/yd$^3$ | 1303 | 1303 | 1303 | 1303 | 1303 | 1303 | 1303 |
| granular material | lbs/yd$^3$ | 0 | 178 | 355 | 710 | 178 | 355 | 710 |
| water | lbs/yd$^3$ | 318 | 318 | 318 | 318 | 318 | 318 | 318 |
| w/c | | 0.52 | 0.52 | 0.52 | 0.52 | 0.52 | 0.52 | 0.52 |
| fiber | type | | shredded post-consumer new s print | shredded post-consumer news print | shredded post-consumer news print | shredded post-consumer news print | shredded post-consumer-news print | shredded post-consumer news print |
| | grams | | 162 | 162 | 162 | 324 | 324 | 324 |
| | lbs/yd$^3$ | | 12.2 | 12.2 | 12.2 | 24.5 | 24.5 | 24.5 |
| accelerator | Type | | aluminum sulfate | aluminum sulfate | aluminum sulfate | aluminum sulfate | aluminum sulfate | aluminum sulfate |
| | grams | | 486 | 486 | 486 | 486 | 486 | 486 |
| | lbs/yd$^3$ | | 36.7 | 36.7 | 36.7 | 36.7 | 36.7 | 36.7 |
| polymer | type | | | | | | | |
| | grams | | | | | | | |
| | lbs/yd$^3$ | | | | | | | |
| compressive strength (psi) | 1 day | 1792 | 2010 | 1468 | 1886 | 1912 | 1946 | 1523 |
| | 7 day | 3649 | 3600 | 3657 | 3631 | 3125 | 3787 | 3647 |
| | 28 day | 5611 | 5315 | 5601 | 5296 | 5206 | 5341 | 4877 |
| granular | yes/no | yes | no | no | no | no | no | no |
| slump | inches | 8 | 7 | 6.5 | 5.25 | 6.5 | 6 | 6.75 |
| weight | grams | 20610 | 20510 | 20340 | 20090 | 20460 | 20440 | 20030 |
| air | % | 2 | 2 | 2.6 | 2.8 | 2.4 | 2.3 | 3.3 |
| unit weight | kg/m$^3$ | 2386 | 2372 | 2348 | 2312 | 2365 | 2362 | 2304 |
| | Pcf | 149.0 | 148.1 | 146.6 | 144.3 | 147.6 | 147.5 | 143.8 |
| concrete temp. | ° C. | 24.4 | 23.8 | 22.2 | 23.8 | 22.2 | 21.6 | 22.2 |

Example 11

In this study, the effect of fiber type, Drill Paper, shredded post-consumer news print and ARBOCEL (All materials were supplied by J Rettenmaier and Soehne, GMBH and CO KG) on the conversion of plastic concrete to a granular form was investigated. All paper types are cellulose-based. The most significant difference between the ARBOCEL material and the other two fibers is the particle size. Drill Paper has an average particle size of equal to or greater than 1.31 mm. The particle size for shredded post-consumer news print is also of the order of 1 mm. The particle size of ARBOCEL is between 0.2 and 0.3 mm. As a result, the dosage efficiency of ARBOCEL should be better than the other two materials. Studies showed that the addition of ARBOCEL was able to produce zero slump concrete (granular material) at dosage rates between 12.2 and 36.7 lbs/yd$^3$. Shredded post-consumer news print and Drill Paper did not produce zero slump concrete at a dosage rate of approximately 12.2 lbs/yd$^3$. Earlier studies showed that the addition of shredded post-consumer news print was able to convert plastic concrete to a granular form. In all cases a set accelerator, aluminum sulfate, was used at a dosage rate of 12.2 lbs/yd$^3$. Even though ARBOCEL had the smallest particle size, the 28 day strengths are significantly higher compared to shredded post-consumer news print and Drill Paper. The 28 day strength for material treated with 36.7 lbs/yd$^3$ of drill paper and shredded post-consumer news print are 737 and 599 psi respectively. For ARBOCEL at equivalent dosage the 28 day strength was more than double, 1565 psi. The higher 28 day compressive strength indicates that the material would be more difficult to break up and would require material management more frequently.

TABLE 11

| | Average Particle Size (% Retained) | | | | Fiber Length | Viscosity (Water) 4% conc., | Viscosity (30W Oil) 2% conc., | Ash Content | Moisture Content | Oil Absorption Times |
|---|---|---|---|---|---|---|---|---|---|---|
| Product | 20 Mesh | 60 Mesh | 100 Mesh | 140 Mesh | Avg. | cP | cP | Max | Max | Weight |
| CF100 | 35-72 | 6-17 | 1-3 | 2-4 | 1.31 mm | 16700 | 140000 | 15% | 7% | 11X |
| CF220 | 17-28 | 10-17 | 3-7 | 4-9 | 1.05 mm | 8400 | 29500 | 27% | 5% | 9X |
| CF315 | 10-18 | 13-21 | 4-8 | 4-10 | 1.05 mm | 25000 | 35500 | 23% | 5% | 5X |
| CF325 | 9-17 | 12-19 | 4-8 | 5-10 | 0.83 mm | 7900 | 35700 | 28% | 5% | 8X |
| CF335 | 8-17 | 11-18 | 4-8 | 4-10 | 0.87 mm | 7400 | 38300 | 29% | 5% | 8X |
| CFS40605 | 0 | 10-30 | 8-14 | 9-23 | 0.53 mm | 1800 | 7400 | 18% | 5% | 8X |
| CF425 | 0-1 | 7-18 | 6-13 | 8-19 | 0.72 mm | 2200 | 8200 | 28% | 5% | 7X |
| CF525 | 0 | 1-12 | 8-15 | 6-20 | 0.57 mm | 2400 | 9800 | 25% | 5% | 6X |
| CF725 | 0 | 0-8 | 8-14 | 13-26 | 0.54 mm | 2600 | 6700 | 25% | 5% | 6X |
| Drill Paper | <50 10 Mesh | 8-14 35 Mesh | 2-6 | N/A | N/A | 13100 | 110300 | 11% | 10% | 11X |

TABLE 11-continued

| Product | Average Particle Size (% Retained) | | | | Fiber Length Avg. | Viscosity (Water) 4% conc., cP | Viscosity (30W Oil) 2% conc., cP | Ash Content Max | Moisture Content Max | Oil Absorption Times Weight |
|---|---|---|---|---|---|---|---|---|---|---|
| | 20 Mesh | 60 Mesh | 100 Mesh | 140 Mesh | | | | | | |
| ARBOCEL | 18 max 20 Mesh | 88 min 40 Mesh | Passing (in Pan) | | 0.2-0.3 mm | | | 0.50% Ash content | Moisture content | |
| SHREDDED POST-CONSUMER NEWS PRINT | 45-62 | 12-21 | 4-17 | | | | | 3-20 | 7% | |

TABLE 11A

| Number | | 1 | 2 | 3 | 4 | 5 | 6 | 7 | 8 | 9 | 10 |
|---|---|---|---|---|---|---|---|---|---|---|---|
| cement | lbs/yd³ | 611 | 611 | 611 | 611 | 611 | 611 | 611 | 611 | 611 | 611 |
| coarse aggregate | lbs/yd³ | 1775 | 1775 | 1775 | 1775 | 1775 | 1775 | 1775 | 1775 | 1775 | 1775 |
| sand | lbs/yd³ | 1303 | 1303 | 1303 | 1303 | 1303 | 1303 | 1303 | 1303 | 1303 | 1303 |
| granular material | lbs/yd³ | 0 | 0 | 0 | 0 | 0 | 0 | 0 | 0 | 0 | 0 |
| water | lbs/yd³ | 318 | 318 | 318 | 318 | 318 | 318 | 318 | 318 | 318 | 318 |
| w/c | | 0.52 | 0.52 | 0.52 | 0.52 | 0.52 | 0.52 | 0.52 | 0.52 | 0.52 | 0.52 |
| fiber | type | | drill paper | drill paper | drill paper | shredded post-consumer news print | shredded post-consumer news print | shredded post-consumer news print | ARBOCEL | ARBOCEL | ARBOCEL |
| | grams | | 162 | 324 | 486 | 162 | 324 | 486 | 162 | 324 | 486 |
| | lbs/yd³ | | 12.2 | 24.5 | 36.7 | 12.2 | 24.5 | 36.7 | 12.2 | 24.5 | 36.7 |
| accelerator | type | | aluminum sulfate | aluminum sulfate | aluminum sulfate | aluminum sulfate | aluminum sulfate | aluminum sulfate | aluminum sulfate | aluminum sulfate | aluminum sulfate |
| | grams | | 162 | 162 | 162 | 162 | 162 | 162 | 162 | 162 | 162 |
| | lbs/yd³ | | 12.2 | 12.2 | 12.2 | 12.2 | 12.2 | 12.2 | 12.2 | 12.2 | 12.2 |
| polymer | type | | | | | | | | | | |
| | grams | | | | | | | | | | |
| | lbs/yd³ | | | | | | | | | | |
| compressive strength (psi) | 1 day | 2034 | 1863 | 739 | 390 | 1156 | 355 | 139 | 1978 | 1816 | 556 |
| | 7 day | 4181 | 3247 | 1257 | 416 | 2577 | 425 | 370 | 3899 | 3410 | 1342 |
| | 28 day | 4826 | 4229 | 1525 | 737 | 2321 | 973 | 599 | 4816 | 4456 | 1565 |
| granular | yes/no | no | no | no | yes | no | yes | Yes | yes | yes | yes |
| slump | inches | 7.5 | 0.25 | 0.25 | 0 | 0.25 | 0 | 0 | 0 | 0 | 0 |
| weight | grams | 20590 | 19640 | 18050 | 17640 | 18370 | 17530 | 16890 | 20030 | 18680 | 18260 |
| air | % | 2.3 | 6.8 | 0 | 0 | 0 | 0 | 0 | 0 | 0 | 0 |
| unit weight | kg/m³ | 2383 | 2249 | 2024 | 1966 | 2069 | 1951 | 1860 | 2304 | 2113 | 2054 |
| | pdf | 148.8 | 140.4 | 126.4 | 122.7 | 129.2 | 121.8 | 116.1 | 143.8 | 131.9 | 128.2 |
| concrete temp. | °C. | 22.2 | 22.2 | 22.2 | 21.6 | 24.4 | 25.5 | 26.1 | 26.1 | 25.5 | 25.5 |

Example 12

In this example, the effect of water absorbing polymers, specifically super absorbent polymer, on the conversion of plastic concrete to granular material was studied in combination with a fixed amount of shredded post-consumer news print and aluminum sulfate. The objective was to determine if the addition of super absorbent polymers could improve the performance of the other materials in the conversion process including post processing behavior. Two super absorbent acrylic polymers with a mean particle size of 20 and 60 microns were used.

Both materials were able to convert plastic concrete to a granular form. In terms of post-processing granular material, concrete treated with shredded post-consumer news print, accelerator and cross-linked modified acrylic polymer, resulted in a decrease in workability and compressive strength as indicated in the table below. The dosage range for the polymers used in this study was between 5.5 and 22 pounds per cubic yard of concrete. In both cases the compressive strength was reduced by approximately 40%.

TABLE 12

| Number | | 1 | 2 | 3 | 4 | 5 | 6 | 7 | 8 |
|---|---|---|---|---|---|---|---|---|---|
| cement | lbs/yd$^3$ | 611 | 611 | 611 | 611 | 611 | 611 | 611 | 611 |
| coarse aggregate | lbs/yd$^3$ | 1775 | 1775 | 1775 | 1775 | 1775 | 1775 | 1775 | 1775 |
| sand | lbs/yd$^3$ | 1303 | 1303 | 1303 | 1303 | 1303 | 1303 | 1303 | 1303 |
| granular material | lbs/yd$^3$ | 0 | 0 | 0 | 0 | 0 | 0 | 0 | 0 |
| water | lbs/yd$^3$ | 318 | 318 | 318 | 318 | 318 | 318 | 318 | 318 |
| w/c | | 0.52 | 0.52 | 0.52 | 0.52 | 0.52 | 0.52 | 0.52 | 0.52 |
| fiber | type | | shredded post-consumer news print | shredded post-consumer news print | shredded post-consumer news print | | shredded post-consumer news print | shredded post-consumer news print | shredded post-consumer news print |
| | grams | | 162 | 162 | 162 | | 162 | 162 | 162 |
| | lbs/yd$^3$ | | 12.2 | 12.2 | 12.2 | | 12.2 | 12.2 | 12.2 |
| accelerator | type | | aluminum sulfate | aluminum sulfate | aluminum sulfate | | aluminum sulfate | aluminum sulfate | aluminum sulfate |
| | grams | | 162 | 162 | 162 | | 162 | 162 | 162 |
| | lbs/yd$^3$ | | 12.2 | 12.2 | 12.2 | | 12.2 | 12.2 | 12.2 |
| polymer | type | | Acrylic polymer 20 microns | Acrylic polymer 20 microns | Acrylic polymer 20 microns | | Acrylic polymer 60 microns | Acrylic polymer 60 microns | Acrylic polymer 60 microns |
| | grams | | 5.5 | 11 | 22 | | 5.5 | 11 | 22 |
| | lbs/yd$^3$ | | 0.4 | 0.8 | 1.7 | | 0.4 | 0.8 | 1.7 |
| compressive strength (psi) | 1 day | 1747 | 1902 | 1674 | 1430 | 1902 | 1871 | 1810 | 1383 |
| | 7 day | 3911 | 3339 | 2672 | 2610 | 3858 | 2976 | 2921 | 2563 |
| | 28 day | 5649 | 4222 | 3849 | 3373 | 7099 | 3850 | 3873 | 3739 |
| granular | yes/no | no | yes | yes | Yes | no | Yes | yes | yes |
| slump | inches | 6 | 0 | 0 | 0 | 6 | 0 | 0 | 0 |
| weight | grams | 20510 | 18180 | 17990 | 18400 | 20600 | 18650 | 18830 | 18760 |
| air | % | 2.6 | 0 | 0 | 0 | 2.1 | 0 | 0 | 0 |
| unit weight | kg/m$^3$ | 2372 | 2043 | 2016 | 2074 | 2384 | 2109 | 2134 | 2125 |
| | pcf | 148.1 | 127.5 | 125.9 | 129.5 | 148.8 | 131.7 | 133.2 | 132.7 |
| concrete temp. | °C. | 22.2 | 25.5 | 25 | 25 | 22.7 | 22.7 | 23.3 | 22.7 |

Example 13

In this study, the effect of fiber type was investigated. Cellulose and glass fibers were compared at different dosage rates to determine the effect on the conversion of plastic concrete to a granular form and on the 28 day compressive strength. Shredded post-consumer news print were added at a dosage range between approximately 12.2 and 36.7 lbs/yd$^3$. The addition of glass fibers was between 36.77 and 61.2 lbs/yd$^3$. In both cases the addition of post-consumer shredded news print or glass fibers could transform plastic concrete to a granular form. The difference between the two fibers was in the 28 day compressive strength. At comparable dosages, the 28 day compressive strength for concrete treated with shredded post-consumer news print was less than material treated with glass fibers. For example, at a dosage of 36.7 lbs/yd$^3$, the compressive strengths for concrete treated with shredded post-consumer news print and glass fibers were 869 and 4466 psi respectively. Even at higher dosages, the 28 day strength for concrete treated with glass fibers, up to a dosage of 61.2 lbs/yd$^3$, was greater than the concrete treated with 36.7 lbs/yd$^3$ of shredded post-consumer news print.

TABLE 13

| Number | | 1 | 2 | 3 | 4 | 5 | 6 | 7 |
|---|---|---|---|---|---|---|---|---|
| cement | lbs/yd³ | 611 | 611 | 611 | 611 | 611 | 611 | 611 |
| coarse aggregate | lbs/yd³ | 1775 | 1775 | 1775 | 1775 | 1775 | 1775 | 1775 |
| sand | lbs/yd³ | 1303 | 1303 | 1303 | 1303 | 1303 | 1303 | 1303 |
| granular material | lbs/yd³ | 0 | 0 | 0 | 0 | 0 | 0 | 0 |
| water | lbs/yd¹ | 318 | 318 | 318 | 318 | 318 | 318 | 318 |
| w/c | | 0.52 | 0.52 | 0.52 | 0.52 | 0.52 | 0.52 | 0.52 |
| fiber | type | | shredded post-consumer news print | shredded post-consumer news print | shredded post-consumer news print | glass fibers | glass fibers | glass fibers |
| | grams | | 162 | 324 | 486 | 486 | 648 | 810 |
| | lbs/yd³ | | 12.2 | 24.5 | 36.7 | 36.7 | 48.9 | 61.2 |
| accelerator | type | | aluminum sulfate | aluminum sulfate | aluminum sulfate | aluminum sulfate | aluminum sulfate | aluminum sulfate |
| | grams | | 324 | 324 | 324 | 324 | 324 | 324 |
| | lbs/yd³ | | 24.5 | 24.5 | 24.5 | 24.5 | 24.5 | 24.5 |
| polymer | type | | | | | | | |
| | grams | | | | | | | |
| | lbs/yd³ | | | | | | | |
| compressive strength (psi) | 1 day | 1640 | 1592 | 730 | 435 | 1774 | 1851 | 1368 |
| | 7 day | 3637 | 2947 | 1268 | 914 | 3346 | 3369 | 2845 |
| | 28 day | 5245 | 3947 | 1678 | 869 | 4466 | 4063 | 3828 |
| granular | yes/no | no | yes | yes | yes | yes | yes | yes |
| slump | inches | 8 | 0 | 0 | 0 | 0 | 0 | 0 |
| weight | grams | 20540 | 17390 | 16700 | 16430 | 17850 | 17890 | 17290 |
| air | % | 1.9 | 0 | 0 | 0 | 0 | 0 | 0 |
| unit weight | kg/m³ | 2376 | 1931 | 1834 | 1795 | 1996 | 2002 | 1917 |
| | pcf | 148.3 | 120.5 | 114.5 | 112.1 | 124.6 | 125.0 | 119.7 |
| concrete temp. | °C. | 22.2 | 22.7 | 23.3 | 23.8 | 23.8 | 24.4 | 24.4 |

Example 14

In this study, the use of cellulose powder (cellulose, microcrystalline powder, material no. 435236 from Sigma-Aldrich, Inc.) was compared to shredded post-consumer news print. In addition mixes were done using a competitive product, Mapei's RECON Zero. Mix number 1 is the reference mix. Mix number 2 uses cellulose powder, specifically microcrystalline cellulose powder with a mean particle size of 125 microns. The powder was being used as a naturally occurring water absorbing material (similar to SAP) and aluminum sulfate at equivalent dosages, 24.5 lbs/yd³. The objective was to determine if there's a difference between the performance of cellulose powder and shredded post-consumer news print. Mix number 6 is the comparable mix using shredded post-consumer news print. In both cases the plastic concrete is transformed to granular form. The most significant difference is the measured 28 day compressive strength. The material or concrete treated with cellulose powder had a compressive strength of 4272 psi after 28 days. The concrete treated with shredded post-consumer news print had a 28 day compressive strength of less than 1600 psi. Mix number three shows the effect of the addition of a small amount of super absorbent polymer and a reduction in aluminum sulfate. In fact, number 3 is an example of concrete treated with RECON Zero plus the addition of cellulose powder. The measured 28 day compressive strength is less than 1000 psi. That represents a significant reduction relative to the reference or untreated mix, 5428 psi. The remaining mixes are replicates from previous studies. Mix number 4 is the treatment of plastic concrete using Mapei's RECON Zero. Mixes 5-7 is the treatment of plastic concrete with a fixed cellulose fiber dosage, 24.5 lbs/yd³, and a variable amount of aluminum sulfate, 12.2-36.7 lbs/yd³.

TABLE 14

| Number | | 1 | 2 | 3 | 4 | 5 | 6 | 7 |
|---|---|---|---|---|---|---|---|---|
| cement | lbs/yd³ | 611 | 611 | 611 | 611 | 611 | 611 | 611 |
| coarse aggregate | lbs/yd³ | 1775 | 1775 | 1775 | 1775 | 1775 | 1775 | 1775 |
| sand | lbs/yd³ | 1303 | 1303 | 1303 | 1303 | 1303 | 1303 | 1303 |
| granular material | lbs/yd³ | 0 | 0 | 0 | 0 | 0 | 0 | 0 |
| water | lbs/yd³ | 318 | 318 | 318 | 318 | 318 | 318 | 318 |
| w/c | | 0.52 | 0.52 | 0.52 | 0.52 | 0.52 | 0.52 | 0.52 |
| fiber | type | | | cellulose powder | | shredded post-consumer news print | shredded post-consumer news print | shredded post-consumer news print |
| | grams | | | 324 | | 324 | 324 | 324 |
| | lbs/yd³ | | | 24.5 | | 24.5 | 24.5 | 24.5 |
| accelerator | type | | aluminum sulfate | aluminum sulfate | aluminum sulfate | aluminum sulfate | aluminum sulfate | aluminum sulfate |
| | grams | | 324 | 324 | 133.7 | 162 | 324 | 486 |
| | lbs/yd³ | | 24.5 | 24.5 | 10.1 | 12.2 | 24.5 | 36.7 |

TABLE 14-continued

| Number | | 1 | 2 | 3 | 4 | 5 | 6 | 7 |
|---|---|---|---|---|---|---|---|---|
| polymer | type | | cellulose powder | sap | sap | | | |
| | grams | | 324 | 11.1 | 11.1 | | | |
| | lbs/yd³ | | 24.5 | 0.8 | 0.8 | | | |
| compressive strength (psi) | 1 day | 2056 | 1970 | 293 | 594 | 1026 | 559 | 499 |
| | 7 day | 4117 | 2488 | 530 | 1177 | 1541 | 1256 | 815 |
| | 28 day | 5428 | 4272 | 823 | 1409 | 2250 | 1594 | 1234 |
| granular | yes/no | no | yes | yes | yes | yes | yes | yes |
| slump | inches | 8 | 0 | 0 | 0 | 0 | 0 | 0 |
| weight | grams | 20610 | 18700 | 17400 | 17870 | 18450 | 17200 | 16810 |
| air | | 2.1 | 0 | 0 | 0 | 0 | 0 | 0 |
| unit weight | kg/m³ | 2386 | 2116 | 1932 | 1999 | 2081 | 1904 | 1849 |
| | pcf | 149.0 | 132.1 | 120.6 | 124.8 | 129.9 | 118.9 | 115.4 |
| concrete temp. | ° C. | 21.6 | 25 | 22.7 | 22.7 | 22.2 | 25.5 | 25.5 |

Example 15

In this study, the replacement of SAP in Mapei's RECON Zero with cellulose powder was investigated. In Mapei's patent they claim that cellulose is a naturally occurring super absorbent polymer and can be used to convert returned concrete to aggregate. In this study cellulose powder (cellulose microcrystalline powder, material no. 435236, from Sigma Aldrich, Inc.) was used to replace the super absorbent polymer at equivalent dosage, 0.8 lbs/yd³. The aluminum sulfate was fixed at 10.1 lbs/yd³. The cellulose powder at 0.8 lbs/yd³ was not sufficient to convert plastic concrete to a granular form indicating that at equivalent dosage it was not as effective as the super absorbent polymer. The compressive strength confirms the ineffectiveness of the cellulose powder. The compressive strength was similar to the reference mix indicating no reduction in strength.

TABLE 15

| Number | | 1 | 2 |
|---|---|---|---|
| Cement | lbs/yd³ | 611 | 611 |
| coarse aggregate | lbs/yd³ | 1775 | 1775 |
| Sand | lbs/yd³ | 1303 | 1303 |
| granular material | lbs/yd³ | 0 | 0 |
| Water | lbs/yd³ | 318 | 318 |
| w/c | | 0.52 | 0.52 |
| Fiber | type | | |
| | grams | | |
| | lbs/yd³ | | |
| accelerator | type | | aluminum sulfate |
| | grams | | 133.7 |
| | lbs/yd³ | | 10.1 |
| polymer | type | | cellulose |
| | grams | | 11.1 |
| | lbs/yd³ | | 0.8 |
| compressive strength (psi) | 1 day | 2159 | 2462 |
| | 7 day | 3846 | 3939 |
| | 28 day | 5030 | 5195 |
| granular | yes/no | No | no |
| slump | inches | 7 | 2.25 |
| weight | grams | 20580 | 20500 |
| air | % | 2.3 | 2 |
| unit weight | kg/m³ | 2382 | 2370 |
| | pcf | 148.7 | 148.0 |
| concrete temp. | ° C. | 23.3 | 26.1 |

Example 16

In this example, the effect of different fiber types and composition were investigated. In an earlier example, glass fibers were used to convert plastic concrete to granular form. The dosage rates were significantly higher compared to shredded post-consumer news print. In this study, fiber glass insulation (Owen's Corning Atticat Expanding Blown-In Insulation), comparable in density to shredded post-consumer news print, was used. The reason to match density was to try and match specific surface area. The dosage of fibers was varied between 12.2 and 36.7 lbs/yd³. The dosage of aluminum sulfate was fixed at 12.2 lbs/yd³. In all cases, the addition of fiber glass or shredded post-consumer news print transforms plastic concrete to granular form. The 28 day compressive strength as a function of dosage are comparable indicating that the treatment or conversion of concrete to a granular form with a concomitant decrease in compressive strength is associated with surface area rather than material chemistry.

TABLE 16

| Number | | 1 | 2 | 3 | 4 | 5 | 6 | 7 |
|---|---|---|---|---|---|---|---|---|
| cement | lbs/yd³ | 611 | 611 | 611 | 611 | 611 | 611 | 611 |
| coarse aggregate | lbs/yd³ | 1775 | 1775 | 1775 | 1775 | 1775 | 1775 | 1775 |
| sand | lbs/yd³ | 1303 | 1303 | 1303 | 1303 | 1303 | 1303 | 1303 |
| granular material | lbs/yd³ | 0 | 0 | 0 | 0 | 0 | 0 | 0 |
| water | lbs/yd³ | 318 | 318 | 318 | 318 | 318 | 318 | 318 |
| w/c | | 0.52 | 0.52 | 0.52 | 0.52 | 0.52 | 0.52 | 0.52 |
| fiber | type | | fiber glass | fiber glass | fiber glass | shredded post-consumer news print | shredded post-consumer news print | shredded post-consumer news print |

TABLE 16-continued

| Number | | 1 | 2 | 3 | 4 | 5 | 6 | 7 |
|---|---|---|---|---|---|---|---|---|
| | grams | | 162 | 324 | 486 | 162 | 324 | 486 |
| | lbs/yd$^3$ | | 12.2 | 24.5 | 36.7 | 12.2 | 24.5 | 36.7 |
| accelerator | type | | aluminum sulfate | aluminum sulfate | aluminum sulfate | aluminum sulfate | aluminum sulfate | aluminum sulfate |
| | grams | | 162 | 162 | 162 | 162 | 162 | 162 |
| | lbs/yd$^3$ | | 12.2 | 12.2 | 12.2 | 12.2 | 12.2 | 12.2 |
| polymer | type | | | | | | | |
| | grams | | | | | | | |
| | lbs/yd$^3$ | | | | | | | |
| compressive strength (psi) | 1 day | 2040 | 2294 | 695 | 400 | 1033 | 653 | 210 |
| | 7 day | 4059 | 3756 | 1456 | 553 | 2440 | 1284 | 578 |
| | 28 day | 4628 | 5049 | 2254 | 982 | 3642 | 1751 | 826 |
| granular | yes/no | no | yes | yes | Yes | Yes | yes | yes |
| slump | inches | 5 | 0 | 0 | 0 | 0 | 0 | 0 |
| weight | grams | 20550 | 20020 | 18230 | 17500 | 19570 | 18500 | 17160 |
| air | % | 2.1 | 0 | 0 | 0 | 0 | 0 | 0 |
| unit weight | kg/m$^3$ | 2377 | 2303 | 2050 | 1947 | 2239 | 2088 | 1899 |
| | pcf | 148.4 | 143.8 | 128.0 | 121.5 | 139.8 | 130.3 | 118.6 |
| concrete temp. | °C. | 23.3 | 25.5 | 27.2 | 25.5 | 25.5 | 25.5 | 24.4 |

Example 17

Batch Number 17395

In this study, the effect of fiber and accelerator dosage on the conversion of plastic concrete to granular form was investigated. Fiber glass (Owen's Corning Atticat Expanding Blown-In Insulation) was used at a dosage between 12.2 and 36.7 lbs/yd$^3$. The accelerator, aluminum sulfate, dosage was between 12.2 and 36.7 lbs/yd$^3$. Similar to the observations made for shredded post-consumer news print and aluminum sulfate, as the dosage of fiber increases the 28 day compressive strength decreases. As the dosage of aluminum sulfate increases, the 28 day compressive strength decreases making the material easier to manage or break up as a function of time.

TABLE 17

| Number | | 1 | 2 | 3 | 4 | 5 | 6 |
|---|---|---|---|---|---|---|---|
| cement | lbs/yd$^3$ | 611 | 611 | 611 | 611 | 611 | 611 |
| coarse aggregate | lbs/yd$^3$ | 1775 | 1775 | 1775 | 1775 | 1775 | 1775 |
| sand | lbs/yd$^3$ | 1303 | 1303 | 1303 | 1303 | 1303 | 1303 |
| granular material | lbs/yd$^3$ | 0 | 0 | 0 | 0 | 0 | 0 |
| water | lbs/yd$^3$ | 318 | 318 | 318 | 318 | 318 | 318 |
| w/c | | 0.52 | 0.52 | 0.52 | 0.52 | 0.52 | 0.52 |
| fiber | type | | fiber glass | fiber glass | fiber glass | fiber glass | fiber glass |
| | grams | | 162 | 324 | 486 | 486 | 324 |
| | lbs/yd$^3$ | | 12.2 | 24.5 | 36.7 | 36.7 | 24.5 |
| accelerator | type | | aluminum sulfate | aluminum sulfate | aluminum sulfate | aluminum sulfate | aluminum sulfate |
| | grams | | 162 | 324 | 486 | 324 | 486 |
| | lbs/yd$^3$ | | 12.2 | 24.5 | 36.7 | 24.5 | 36.7 |
| polymer | type | | | | | | |
| | grams | | | | | | |
| | lbs/yd$^3$ | | | | | | |
| compressive strength (psi) | 1 day | 2014 | 2583 | 593 | 303 | 312 | 488 |
| | 7 day | 3624 | 4295 | 2130 | 546 | 653 | 1070 |
| | 28 day | 4737 | 5750 | 2415 | 891 | 1389 | 1118 |
| granular | yes/no | no | yes | Yes | Yes | yes | yes |
| slump | inches | 6.75 | 0 | 0 | 0 | 0 | 0 |
| weight | grams | 20440 | 20140 | 19270 | 17850 | 18210 | 18290 |
| air | % | 2.3 | 0 | 0 | 0 | 0 | 0 |
| unit weight | kg/m$^3$ | 2362 | 2319 | 2197 | 1996 | 2047 | 2058 |
| | pcf | 147.5 | 144.8 | 137.2 | 124.6 | 127.8 | 128.5 |
| concrete temp. | °C. | 25.5 | 25.5 | 26.6 | 27.7 | 27.2 | 27.7 |

Example 18

In this study, the effect of fiber and accelerator dosage on the conversion of plastic concrete to granular form was investigated. Fiber glass (Owen's Corning AttiCat Expanding Blown-In Insulation) was used at a dosage between 12.2 and 36.7 lbs/yd$^3$. The accelerator, aluminum sulfate, was used at a dosage between 12.2 and 36.7 lbs/yd$^3$. Similar to the observations made for shredded post-consumer news print and aluminum sulfate, as the dosage of fiber increases the 28 day compressive strength decreases. As the dosage of aluminum sulfate increases, the 28 day compressive strength decreases making the material easier to manage or break up as a function of time.

TABLE 18

| Number | | 1 | 2 | 3 | 4 | 5 | 6 | 7 |
|---|---|---|---|---|---|---|---|---|
| cement | lbs/yd3 | 611 | 611 | 611 | 611 | 611 | 611 | 611 |
| coarse aggregate | lbs/yd3 | 1775 | 1775 | 1775 | 1775 | 1775 | 1775 | 1775 |
| sand | lbs/yd3 | 1303 | 1303 | 1303 | 1303 | 1303 | 1303 | 1303 |
| granular material | lbs/yd3 | 0 | 0 | 0 | 0 | 0 | 0 | 0 |
| water | lbs/yd3 | 318 | 318 | 318 | 318 | 318 | 318 | 318 |
| w/c | | 0.52 | 0.52 | 0.52 | 0.52 | 0.52 | 0.52 | 0.52 |
| fiber | type | | fiber glass | fiber glass | fiber glass | fiber glass | fiber glass | fiber glass |
| | grams | | 162 | 324 | 486 | 162 | 324 | 486 |
| | lbs/yd3 | | 12.2 | 24.5 | 36.7 | 12.2 | 24.5 | 36.7 |
| accelerator | type | | aluminum sulfate | aluminum sulfate | aluminum sulfate | aluminum sulfate | aluminum sulfate | aluminum sulfate |
| | grams | | 162 | 162 | 162 | 486 | 486 | 486 |
| | lbs/yd3 | | 12.2 | 12.2 | 12.2 | 36.7 | 36.7 | 36.7 |
| polymer | type | | | | | | | |
| | grams | | | | | | | |
| | lbs/yd3 | | | | | | | |
| compressive strength (psi) | 1 day | 2027 | 2349 | 957 | 328 | 433 | 238 | 159 |
| | 7 day | 3934 | 4664 | 1830 | 790 | 615 | 391 | 348 |
| | 28 day | 4911 | 5680 | 2572 | 1083 | 1166 | 598 | 389 |
| granular | yes/no | no | yes | yes | yes | yes | yes | yes |
| slump | inches | 5.5 | 0 | 0 | 0 | 0 | 0 | 0 |
| weight | grams | 20620 | 20380 | 20010 | 18950 | 19140 | 18480 | 17860 |
| air | % | 2.1 | 0 | 0 | 0 | 0 | 0 | 0 |
| unit weight | kg/m3 | 2387 | 2353 | 2301 | 2151 | 2178 | 2085 | 1997 |
| | pcf | 149.0 | 146.9 | 143.6 | 134.3 | 136.0 | 130.2 | 124.7 |
| concrete temp. | ° C. | 22.2 | 26.1 | 25.5 | 26.6 | 27.7 | 26.6 | 27.2 |

Example 19

In this study, the effect of fiber dosage on the conversion of plastic concrete to granular form was investigated. Fiber glass (Owen's Corning AttiCat Expanding Blown-In Insulation) was used at a dosage between 12.2 and 36.7 lbs/yd$^3$. The accelerator, aluminum sulfate, dosage was fixed at 24.5 lbs/yd$^3$. Similar to the observations made for shredded post-consumer news print and aluminum sulfate, as the dosage of fiber increases the 28 day compressive strength decreases. As the dosage of aluminum sulfate increases, the 28 day compressive strength decreases making the material easier to manage or break up as a function of time.

TABLE 19

| Number | | 1 | 2 | 3 | 4 | 5 |
|---|---|---|---|---|---|---|
| cement | lbs/yd$^3$ | 611 | 611 | 611 | 611 | 611 |
| coarse aggregate | lbs/yd$^3$ | 1775 | 1775 | 1775 | 1775 | 1775 |
| sand | lbs/yd$^3$ | 1303 | 1303 | 1303 | 1303 | 1303 |
| granular material | lbs/yd$^3$ | 0 | 0 | 0 | 0 | 0 |
| water | lbs/yd$^3$ | 318 | 318 | 318 | 318 | 318 |
| w/c | | 0.52 | 0.52 | 0.52 | 0.52 | 0.52 |
| fiber | type | | fiber glass | fiber glass | fiber glass | shredded post-consumer news print |

TABLE 19-continued

| Number | | 1 | 2 | 3 | 4 | 5 |
|---|---|---|---|---|---|---|
| | grams | | 162 | 324 | 486 | 162 |
| | lbs/yd$^3$ | | 12.2 | 24.5 | 36.7 | 12.2 |
| accelerator | type | | aluminum sulfate | aluminum sulfate | aluminum sulfate | aluminum sulfate |
| | grams | | 324 | 324 | 324 | 324 |
| | lbs/yd$^3$ | | 24.5 | 24.5 | 24.5 | 24.5 |
| polymer | type | | | | | |
| | grams | | | | | |
| | lbs/yd$^3$ | | | | | |
| compressive strength (psi) | 1 day | 1839 | 1725 | 1301 | 678 | 1906 |
| | 7 day | 3848 | 3170 | 2416 | 1294 | 3682 |
| | 28 day | 5080 | 4230 | 3147 | 2181 | 4579 |
| granular | yes/no | no | Yes | Yes | yes | yes |
| slump | inches | 7.75 | 0 | 0 | 0 | 0 |
| weight | grams | 19950 | 19600 | 19410 | 18530 | 19800 |
| air | % | 2.2 | 0 | 0 | 0 | 0 |
| unit weight | kg/m$^3$ | 2293 | 2243 | 2216 | 2092 | 2271 |
| | pcf | 143.1 | 140.0 | 138.3 | 130.6 | 141.8 |
| concrete temp. | °C. | 22.7 | 22.7 | 27.2 | 26.6 | 27.2 |

Example 20

In this study, higher dosage rates, greater than 36.7 lbs/yd$^3$, of shredded post-consumer newsprint were investigated. The shredded newsprint dosage was varied between 48.9 and 73.4 lbs/yd$^3$. As the shredded newsprint dosage increases, the 28 day compressive strength decreases. The same is true for the accelerator. At equivalent shredded newsprint dosages, an increase in accelerator dosage results in a decrease in 28 day strength. In all cases, the addition of shredded post-consumer news print and aluminum sulfate at dosages in excess of 36.7 lbs/yd$^3$ transforms plastic concrete to a granular form.

TABLE 20

| Number | | 1 | 2 | 3 | 4 | 5 | 6 | 7 |
|---|---|---|---|---|---|---|---|---|
| cement | lbs/yd$^3$ | 611 | 611 | 611 | 611 | 611 | 611 | 611 |
| coarse aggregate | lbs/yd$^3$ | 1775 | 1775 | 1775 | 1775 | 1775 | 1775 | 1775 |
| sand | lbs/yd$^3$ | 1303 | 1303 | 1303 | 1303 | 1303 | 1303 | 1303 |
| granular material | lbs/yd$^3$ | 0 | 0 | 0 | 0 | 0 | 0 | 0 |
| water | lbs/yd$^3$ | 318 | 318 | 318 | 318 | 318 | 318 | 318 |
| w/c | | 0.52 | 0.52 | 0.52 | 0.52 | 0.52 | 0.52 | 0.52 |
| fiber | type | | shredded post-consumer news print | shredded post-consumer news print | shredded post-consumer news print | shredded post-consumer news print | shredded post-consumer news print | shredded post-consumer news print |
| | grams | | 648 | 810 | 972 | 648 | 810 | 972 |
| | lbs/yd$^3$ | | 48.9 | 61.2 | 73.4 | 48.9 | 61.2 | 73.4 |
| accelerator | type | | aluminum sulfate | aluminum sulfate | aluminum sulfate | aluminum sulfate | aluminum sulfate | aluminum sulfate |
| | grams | | 486 | 486 | 486 | 324 | 324 | 324 |
| | lbs/yd$^3$ | | 36.7 | 36.7 | 36.7 | 24.5 | 24.5 | 24.5 |
| polymer | type | | | | | | | |
| | grams | | | | | | | |
| | lbs/yd$^3$ | | | | | | | |
| compressive strength (psi) | 1 day | 1765 | 430 | 173 | 126 | 343 | 192 | 108 |
| | 7 day | 4364 | 709 | 360 | 252 | 898 | 464 | 273 |
| | 28 day | 5192 | 919 | 328 | 254 | 553 | 436 | 323 |
| granular | yes/no | no | yes | yes | Yes | yes | yes | yes |
| slump | inches | 7.75 | 0 | 0 | 0 | 0 | 0 | 0 |
| weight | grams | 20580 | 18400 | 17240 | 17000 | 17800 | 17480 | 17300 |
| air | % | 1.9 | 0 | 0 | 0 | 0 | 0 | 0 |
| unit weight | kg/m$^3$ | 2382 | 2074 | 1910 | 1876 | 1989 | 1944 | 1918 |
| | pcf | 148.7 | 129.5 | 119.2 | 117.1 | 124.2 | 121.4 | 119.7 |
| concrete temp. | °C. | 23.3 | 28.8 | 27.7 | 28.8 | 29.3 | 27.7 | 27.7 |

Example 21

In this study, higher dosage rates, greater than 36.7 lbs/yd$^3$, of fiber glass (Owen's Corning AttiCat Expanding Blown-In Insulation) was investigated. The fiber dosage was varied between 48.9 and 73.4 lbs/yd$^3$. As the fiber dosage increases, the 28 day compressive strength decreases. The same is true for the accelerator. At equivalent fiber dosages, an increase in accelerator dosage results in a decrease in 28 day strength. In all cases, the addition of fiber glass and aluminum sulfate at dosages in excess of 36.7 lbs/yd$^3$ transforms plastic concrete to a granular form.

TABLE 21

| Number | | 1 | 2 | 3 | 4 | 5 | 6 | 7 |
|---|---|---|---|---|---|---|---|---|
| cement | lbs/yd$^3$ | 611 | 611 | 611 | 611 | 611 | 611 | 611 |
| coarse aggregate | lbs/yd$^3$ | 1775 | 1775 | 1775 | 1775 | 1775 | 1775 | 1775 |
| sand | lbs/yd$^3$ | 1303 | 1303 | 1303 | 1303 | 1303 | 1303 | 1303 |
| granular material | lbs/yd$^3$ | 0 | 0 | 0 | 0 | 0 | 0 | 0 |
| water | lbs/yd$^3$ | 318 | 318 | 318 | 318 | 318 | 318 | 318 |
| w/c | | 0.52 | 0.52 | 0.52 | 0.52 | 0.52 | 0.52 | 0.52 |
| fiber | type | | fiber glass | fiber glass | fiber glass | fiber glass | fiber glass | fiber glass |
| | grams | | 648 | 810 | 972 | 648 | 810 | 972 |
| | lbs/yd$^3$ | | 48.9 | 61.2 | 73.4 | 48.9 | 61.2 | 73.4 |
| accelerator | type | | aluminum sulfate | aluminum sulfate | aluminum sulfate | aluminum sulfate | aluminum sulfate | aluminum sulfate |
| | grams | | 324 | 324 | 324 | 486 | 486 | 486 |
| | lbs/yd$^3$ | | 24.5 | 24.5 | 24.5 | 36.7 | 36.7 | 36.7 |
| polymer | type | | | | | | | |
| | grams | | | | | | | |
| | lbs/yd$^3$ | | | | | | | |
| compressive strength (psi) | 1 day | 1660 | 303 | 275 | 131 | 158 | 109 | 72 |
| | 7 day | 3815 | 684 | 419 | 217 | 262 | 235 | 99 |
| | 28 day | 5297 | 740 | 527 | 217 | 490 | 260 | 89 |
| granular | yes/no | no | yes | yes | yes | yes | yes | yes |
| slump | inches | 6.75 | 0 | 0 | 0 | 0 | 0 | 0 |
| weight | grams | 20590 | 15880 | 15500 | 15420 | 16600 | 16080 | 15320 |
| air | % | 2 | 0 | 0 | 0 | 0 | 0 | 0 |
| unit weight | kg/m$^3$ | 2383 | 1718 | 1664 | 1653 | 1819 | 1746 | 1639 |
| | pcf | 148.8 | 107.3 | 103.9 | 103.2 | 113.6 | 109.0 | 102.3 |
| concrete temp. | ° C. | 21.1 | 22.2 | 24.4 | 25 | 23.3 | 25 | 24.4 |

Example 22

In this study, the addition or dosage of fiber glass (Owen's Corning Expanding Blown-In Insulation) was investigated at values equal to and less than 36.7 lbs/yd$^3$ and at a fixed accelerator dosage of 12.2 lbs/yd$^3$. The fiber dosage was varied between 6.1 and 36.7 lbs/yd$^3$. As the fiber dosage increased, the 28 day compressive strength decreased. In all cases, the addition of fiber glass at dosages between 6.1 and 36.7 lbs/yd$^3$ transformed plastic concrete to a granular form at a fixed dosage of aluminum sulfate, 12.2 lbs/yd$^3$. The 28 day compressive strength does not change significantly until the dosage exceeds 12.2 lbs/yd$^3$. At a fiber glass dosage of 24.5 lbs/yd$^3$, the 28 day compressive strength decrease from approximately 4595 psi for the reference mix to 3237 psi.

TABLE 22

| Number | | 1 | 2 | 3 | 4 | 5 |
|---|---|---|---|---|---|---|
| cement | lbs/yd$^3$ | 611 | 611 | 611 | 611 | 611 |
| coarse aggregate | lbs/yd$^3$ | 1775 | 1775 | 1775 | 1775 | 1775 |
| sand | lbs/yd$^3$ | 1303 | 1303 | 1303 | 1303 | 1303 |
| granular material | lbs/yd$^3$ | 0 | 0 | 0 | 0 | 0 |
| water | lbs/yd$^3$ | 318 | 318 | 318 | 318 | 318 |
| w/c | | 0.52 | 0.52 | 0.52 | 0.52 | 0.52 |
| fiber | type | | fiber glass | fiber glass | fiber glass | fiber glass |
| | grams | | 81 | 162 | 324 | 486 |
| | lbs/yd$^3$ | | 6.1 | 12.2 | 24.5 | 36.7 |

TABLE 22-continued

| Number | | 1 | 2 | 3 | 4 | 5 |
|---|---|---|---|---|---|---|
| accelerator | type | | aluminum sulfate | aluminum sulfate | aluminum sulfate | aluminum sulfate |
| | grams | | 162 | 162 | 162 | 162 |
| | lbs/yd³ | | 12.2 | 12.2 | 12.2 | 12.2 |
| polymer | type | | | | | |
| | grams | | | | | |
| | lbs/yd³ | | | | | |
| compressive strength (psi) | 1 day | 2072 | 2443 | 2210 | 1597 | 592 |
| | 7 day | 4272 | 4114 | 4457 | 3009 | 1541 |
| | 28 day | 4595 | 5232 | 5107 | 3237 | 1170 |
| granular | yes/no | no | yes | yes | yes | yes |
| slump | inches | 8 | 0 | 0 | 0 | 0 |
| weight | grams | 20770 | 20460 | 19690 | 19550 | 18030 |
| air | % | 1.9 | 0 | 0 | 0 | 0 |
| unit weight | kg/m³ | 2408 | 2365 | 2256 | 2236 | 2021 |
| | pcf | 150.3 | 147.6 | 140.8 | 139.6 | 126.2 |
| concrete temp. | ° C. | 21.6 | 23.3 | 22.2 | 22.7 | 22.7 |

Example 23

In this study, the addition or dosage of shredded post-consumer news print was investigated at values equal to and less than 36.7 lbs/yd³ at a fixed accelerator dosage of 12.2 lbs/yd³. The shredded newsprint dosage was varied between 6.1 and 36.7 lbs/yd³. As the shredded newsprint dosage increased, the 28 day compressive strength decreased. In all cases, the addition of shredded post-consumer news print at dosages between 6.1 and 36.7 lbs/yd³ transformed plastic concrete to a granular form at a fixed dosage of aluminum sulfate, 12.2 lbs/yd³. The 28 day compressive strength does not change significantly until the dosage exceeds 6.1 lbs/yd³. At a shredded newsprint dosage of 12.2 lbs/yd³, the 28 day compressive strength decrease from approximately 5349 psi for the reference mix to 4194 psi. At a shredded newsprint dosage of 24.5 lbs/yd³, the 28 day compressive strength decreases to 1499 psi, a 72% strength reduction.

TABLE 23

| Number | | 1 | 2 | 3 | 4 | 5 |
|---|---|---|---|---|---|---|
| cement | lbs/yd³ | 611 | 611 | 611 | 611 | 611 |
| coarse aggregate | lbs/yd³ | 1775 | 1775 | 1775 | 1775 | 1775 |
| sand | lbs/yd³ | 1303 | 1303 | 1303 | 1303 | 1303 |
| granular material | lbs/yd³ | 0 | 0 | 0 | 0 | 0 |
| water | lbs/yd³ | 318 | 318 | 318 | 318 | 318 |
| w/c | | 0.52 | 0.52 | 0.52 | 0.52 | 0.52 |
| fiber | type | | shredded post-consumer news print | shredded post-consumer news print | shredded post-consumer news print | shredded post-consumer news print |
| | grams | | 81 | 162 | 324 | 486 |
| | lbs/yd³ | | 6.1 | 12.2 | 24.5 | 36.7 |
| accelerator | type | | aluminum sulfate | aluminum sulfate | aluminum sulfate | aluminum sulfate |
| | grams | | 162 | 162 | 162 | 162 |
| | lbs/yd³ | | 12.2 | 12.2 | 12.2 | 12.2 |
| polymer | type | | | | | |
| | grams | | | | | |
| | lbs/yd³ | | | | | |
| compressive strength (psi) | 1 day | 2058 | 2315 | 1987 | 429 | 294 |
| | 7 day | 4040 | 4274 | 3427 | 984 | 518 |
| | 28 day | 5349 | 5483 | 4194 | 1499 | 669 |
| granular | yes/no | no | yes | yes | yes | yes |
| slump | inches | 7.5 | 0 | 0 | 0 | 0 |
| weight | grams | 20610 | 20290 | 17900 | 16100 | 16160 |
| air | % | 2 | 0 | 0 | 0 | 0 |
| unit weight | kg/m³ | 2386 | 2341 | 2003 | 1749 | 1757 |
| | pcf | 149.0 | 146.1 | 125.0 | 109.2 | 109.7 |
| concrete temp. | ° C. | 21.6 | 22.7 | 23.8 | 24.4 | 25 |

Example 24

Batch Number 17435

In this study, higher dosage rates, greater than 36.7 lbs/yd$^3$, of shredded post-consumer news print was investigated. The dosage rate of set accelerator was fixed at 12.2 lbs/yd$^3$. The dosage was varied between 48.9 and 73.4 lbs/yd$^3$. As the shredded newsprint dosage increases, the 28 day compressive strength decreases. In all cases, the addition of shredded post-consumer news print at dosages in excess of 37 lbs/yd$^3$ transforms plastic concrete to a granular form. The one interesting observation is that the addition of accelerator, though makes a small difference is not be required to reduce 28 day compressive strengths to facilitate management of granular material. In fact results show that the compressive strength begins to converge as the fiber dosage increases independent of the accelerator dosage. These results indicate that shredded newsprint alone is sufficient to convert plastic concrete to a granular form and facilitate the management of the granular material over time.

TABLE 24

| Number | | 1 | 2 | 3 | 4 |
|---|---|---|---|---|---|
| cement | lbs/yd$^3$ | 611 | 611 | 611 | 611 |
| coarse aggregate | lbs/yd$^3$ | 1775 | 1775 | 1775 | 1775 |
| sand | lbs/yd$^3$ | 1303 | 1303 | 1303 | 1303 |
| granular material | lbs/yd$^3$ | 0 | 0 | 0 | 0 |
| water | lbs/yd$^3$ | 318 | 318 | 318 | 318 |
| w/c | | 0.52 | 0.52 | 0.52 | 0.52 |
| fiber | type | | shredded post-consumer news print | shredded post-consumer news print | shredded post-consumer news print |
| | grams | | 648 | 810 | 972 |
| | lbs/yd$^3$ | | 48.9 | 61.2 | 73.4 |
| accelerator | type | | aluminum sulfate | aluminum sulfate | aluminum sulfate |
| | grams | | 162 | 162 | 162 |
| | lbs/yd$^3$ | | 12.2 | 12.2 | 12.2 |
| polymer | type | | | | |
| | grams | | | | |
| | lbs/yd$^3$ | | | | |
| compressive strength (psi) | 1 day | 1854 | 311 | 112 | 65 |
| | 7 day | 3915 | 345 | 284 | 122 |
| | 28 day | | | | |
| granular | yes/no | no | Yes | yes | yes |
| slump | inches | 8 | 0 | 0 | 0 |
| weight | grams | 20540 | 17960 | 17480 | 16960 |
| air | % | 2.3 | 0 | 0 | 0 |
| unit weight | kg/m$^3$ | 2376 | 2012 | 1944 | 1870 |
| | pcf | 148.3 | 125.6 | 121.4 | 116.7 |
| concrete temp. | °C. | 21.1 | 21.1 | 22.9 | 22.2 |

Example 25

In this study, the effect of shredded post-consumer news print in the absence of a set accelerator was investigated. The shredded newsprint dosage was varied between 48.9 and 73.4 lbs/yd$^3$. As the shredded newsprint dosage increases, the 7 day compressive strength decreases. At such high shredded newsprint dosages, the 28 day cylinders fell apart. In all cases, the addition of shredded post-consumer news print at dosages in excess of 37 lbs/yd$^3$ transforms plastic concrete to a granular form. In this study it was demonstrated that the addition of a set accelerator, aluminum sulfate, though makes a small difference in strength development, is not required to produce a granular material that can be managed over time.

TABLE 25

| Number | | 1 | 2 | 3 | 4 |
|---|---|---|---|---|---|
| cement | lbs/yd$^3$ | 611 | 611 | 611 | 611 |
| coarse aggregate | lbs/yd$^3$ | 1775 | 1775 | 1775 | 1775 |
| sand | lbs/yd$^3$ | 1303 | 1303 | 1303 | 1303 |
| granular material | lbs/yd$^3$ | 0 | 0 | 0 | 0 |
| water | lbs/yd$^3$ | 318 | 318 | 318 | 318 |
| w/c | | 0.52 | 0.52 | 0.52 | 0.52 |
| fiber | type | | shredded post-consumer news print | shredded post-consumer news print | shredded post-consumer news print |
| | grams | | 648 | 810 | 972 |
| | lbs/yd$^3$ | | 48.9 | 61.2 | 73.4 |
| accelerator | type | | | | |
| | grams | | | | |
| | lbs/yd$^3$ | | | | |
| polymer | type | | | | |
| | grams | | | | |
| | lbs/yd$^3$ | | | | |
| compressive strength (psi) | 1 day | 1821 | 247 | 200 | 108 |
| | 7 day | 4346 | 531 | 565 | 343 |
| | 28 day | | | | |
| granular | yes/no | no | yes | yes | yes |
| slump | inches | 4.25 | 0 | 0 | 0 |
| weight | grams | 20530 | 18310 | 17540 | 17470 |
| air | % | 2.5 | 0 | 0 | 0 |
| unit weight | kg/m$^3$ | 2375 | 2061 | 1952 | 1942 |
| | pcf | 148.3 | 128.7 | 121.9 | 121.2 |
| concrete temp. | °C. | 21.1 | 20.6 | 20 | 20 |

Example 26

In this study, the effect of fiber glass in the absence of a set accelerator was investigated. The fiber glass dosage was varied between 43.5 and 73.4 lbs/yd$^3$. As the fiber glass dosage increases, the 7 day compressive strength decreases. At such high fiber dosages, the 28 day cylinders fell apart. In all cases, the addition of fiber glass at dosages in excess of 37 lbs/yd$^3$ transforms plastic concrete to a granular form. In this study it was demonstrated that the addition of a set accelerator, aluminum sulfate, though makes a small difference in strength development, is not required to produce a granular material that can be managed over time.

TABLE 26

| Number | | 1 | 2 | 3 | 4 |
|---|---|---|---|---|---|
| cement | lbs/yd$^3$ | 611 | 611 | 611 | 611 |
| coarse aggregate | lbs/yd$^3$ | 1775 | 1775 | 1775 | 1775 |
| sand | lbs/yd$^3$ | 1303 | 1303 | 1303 | 1303 |
| granular material | lbs/yd$^3$ | 0 | 0 | 0 | 0 |
| water | lbs/yd$^3$ | 318 | 318 | 318 | 318 |
| w/c | | 0.52 | 0.52 | 0.52 | 0.52 |
| fiber | type | | glass fibers | glass fibers | glass fibers |
| | grams | | 648 | 576 | 972 |
| | lbs/yd$^3$ | | 48.9 | 43.5 | 73.4 |
| accelerator | type | | | | |
| | grams | | | | |
| | lbs/yd$^3$ | | | | |
| polymer | type | | | | |
| | grams | | | | |
| | lbs/yd$^3$ | | | | |
| compressive strength (psi) | 1 day | 1572 | 357 | 567 | 122 |
| | 7 day | 3949 | 555 | 660 | 277 |
| | 28 day | | | | |

TABLE 26-continued

| Number | | 1 | 2 | 3 | 4 |
|---|---|---|---|---|---|
| granular | yes/no | no | yes | yes | yes |
| slump | inches | 6.75 | 0 | 0 | 0 |
| weight | grams | 20550 | 17440 | 17800 | 17530 |
| air | % | 2.3 | 0 | 0 | 0 |
| unit weight | kg/m³ | 2377 | 1938 | 1989 | 1951 |
| | pcf | 148.4 | 121.0 | 124.2 | 121.8 |
| concrete temp. | °C. | 22.2 | 22.2 | 22.7 | 21.6 |

Example 27

In this study, the introduction of additional mix water on the effect of shredded post-consumer news print and aluminum sulfate to convert plastic concrete to granular form was investigated. In this case the shredded newsprint and aluminum dosage were fixed at 24.5 lbs/yd³. That amount of additional water was increased from 16.7 lbs/yd3 to 100.1 lbs/yd3 (or 2 to 12 gallons/yd³). In the range studied there was a no change in compressive strength. The 7 day strength varied between 856 and 1669 psi with the highest value measured at the lowest water addition rate. It makes sense in terms of the effect water/cement ratio has on strength.

TABLE 27

| Number | | 1 | 2 | 3 | 4 | 5 | 6 | 7 |
|---|---|---|---|---|---|---|---|---|
| cement | lbs/yd³ | 611 | 611 | 611 | 611 | 611 | 611 | 611 |
| coarse aggregate | lbs/yd³ | 1775 | 1775 | 1775 | 1775 | 1775 | 1775 | 1775 |
| sand | lbs/yd³ | 1303 | 1303 | 1303 | 1303 | 1303 | 1303 | 1303 |
| granular material | lbs/yd³ | 0 | 0 | 0 | 0 | 0 | 0 | 0 |
| water | lbs/yd³ | 318 | 318 | 318 | 318 | 318 | 318 | 318 |
| w/c | | 0.52 | 0.52 | 0.52 | 0.52 | 0.52 | 0.52 | 0.52 |
| fiber | type | | shredded post-consumer news print | shredded post-consumer news print | shredded post-consumer news print | shredded post-consumer news print | shredded post-consumer news print | shredded post-consumer news print |
| | grams | | 324 | 324 | 324 | 324 | 324 | 324 |
| | lbs/yd³ | | 24.5 | 24.5 | 24.5 | 24.5 | 24.5 | 24.5 |
| accelerator | type | | aluminum sulfate | aluminum sulfate | aluminum sulfate | aluminum sulfate | aluminum sulfate | aluminum sulfate |
| | grams | | 324 | 324 | 324 | 324 | 324 | 324 |
| | lbs/yd³ | | 24.5 | 24.5 | 24.5 | 24.5 | 24.5 | 24.5 |
| polymer | type | | additional water | additional water | additional water | additional water | additional water | additional water |
| | grams | | 221 | 442 | 662 | 883 | 1104 | 1325 |
| | lbs/yd³ | | 16.7 | 33.4 | 50.0 | 66.7 | 83.4 | 100.1 |
| compressive strength (psi) | 1 day | 2018 | 738 | 670 | 695 | 636 | 627 | 509 |
| | 7 day | 4673 | 1669 | 1031 | 931 | 856 | 1281 | 1105 |
| | 28 day | | | | | | | |
| granular | yes/no | no | yes | yes | yes | yes | yes | yes |
| slump | inches | 8 | 0 | 0 | 0 | 0 | 0 | 0 |
| weight | grams | 20680 | 18900 | 18120 | 18560 | 18770 | 19200 | 19130 |
| air | % | 1.5 | 0 | 0 | 0 | 0 | 0 | 0 |
| unit weight | kg/m³ | 2396 | 2144 | 2034 | 2096 | 2126 | 2187 | 2177 |
| | pcf | 149.6 | 133.8 | 127.0 | 130.8 | 132.7 | 136.5 | 135.9 |
| concrete temp. | °C. | 22.7 | 26.1 | 26.6 | 26.6 | 26.1 | 27.2 | 27.2 |

What is claimed is:

1. A method for producing aggregate particles from cementitious compositions, comprising: combining in a vessel a cementitious composition and at least one aggregate-forming inducer for adhering to cement paste, wherein the at least one aggregate-forming inducer comprises a fiber having an elongated body with a length to equivalent diameter ratio of at least 10 and, when added to the cementitious composition, introduces a surface area of between 500 and 10,000 square meters per cubic meter for cement paste to bond/adhere to, wherein the at least one aggregate-forming inducer is chosen from shredded and/or cut paper, cardboard, corrugated cardboard, cartons, corrugated cartons, crepe paper, newsprint, kraft paper, wall paper, wax paper, silk paper, shredded currencies removed from circulation, wood fibers, glass fibers, shredded textiles, cotton fibers, hemp, mineral fiber chosen from wollastonite, mica, rock wool, slag wool, graphite, natural fibers chosen from sisal fibers, cotton, flax, jute, coconut husks, protein-based fibers, banana, pineapple, wool, mohair, silk, and mixtures of any of the foregoing.

2. The method of claim 1, wherein said surface area is between 1,000 and 5,000 square meters per cubic meter of cementitious composition.

3. The method of claim 1, wherein the fiber having an elongated body has a length to equivalent diameter ratio of at least 50.

4. The method of claim 1, wherein the fiber having an elongated body increases its specific surface area during mixing of the concrete due to surface roughening or fibrillation by at least 10 percent.

5. The method of claim 1, wherein said vessel is the drum of a concrete mixing truck or a stationary mixing drum or pan or any mixing vessel where the vessel rotates or the mixing blades rotate.

6. The method of claim 1 wherein the time needed to combine said at least one aggregate-forming inducer and the cementitious composition and convert the resulting mix to a granular material is 1 to 10 minutes per cubic yard of cementitious composition.

7. The method of claim 1 wherein the aggregate-forming inducer does not negatively impact subsequent concrete mixes with regard to its plastic and hardened properties chosen from air, unit weight, slump, set time and strength.

8. The method of claim 1 wherein the cementitious composition is residual or returned concrete or is a cementitious paste fraction separated from residual or returned concrete.

9. The method of claim 1, wherein said aggregate-forming inducer is newsprint.

10. The method of claim 9, wherein said newsprint is shredded and has a surface area per unit weight between 10 and 500 square meters per kilogram.

11. The method of claim 1 wherein the cementitious composition is returned concrete in a delivery truck mixer-drum, and the at least one aggregate-forming inducer is shredded newsprint.

12. The method of claim 1, further comprising the addition of an admixture chosen from one or more set accelerators, set retarders, water reducers, rheology modifiers chosen from clay, super absorbent polymers and thickeners, corrosion inhibitors, shrinkage reducing admixtures, colorants, air entrainers, air detrainers, and combinations thereof.

13. The method of claim 12, wherein said set accelerator is aluminum sulfate, aluminum trihydrate, calcium nitrate, calcium nitrite, calcium chloride, sodium nitrate, thiocyanate or mixtures thereof.

14. The method of claim 1, further comprising the addition of a super absorbent polymer chosen from sodium polyacrylate, carboxyalkyl cellulose polymers, carboxyalkyl starch polymers, alginates, chitosans, starches, polyacrylic acid polymers, polyacrylamide polymers and polyaspartic acid polymers.

15. A cementitious composition comprising a paste portion and aggregate formed by the method of claim 1.

16. The method of claim 1 wherein the vessel is a rotatable concrete mixer drum mounted on a concrete ready-mix delivery vehicle, the method further comprising monitoring the concrete within the mixer drum using an automated slump monitoring system to ensure that the aggregate-forming inducer becomes uniformly mixed within concrete contained within the mixer drum.

17. A method for producing aggregate particles from cementitious compositions, comprising: combining a cementitious composition and a formulation consisting essentially of at least one aggregate-forming inducer, wherein the at least one aggregate-forming inducer when added to said cementitious composition introduces surface area of between 500 and 10,000 square meters per cubic meter of the cementitious composition, and mixing said cementitious composition with said formulation until the mixed components form granular material, wherein the at least one aggregate-forming inducer is chosen from shredded and/or cut paper, cardboard, corrugated cardboard, cartons, corrugated cartons, crepe paper, newsprint, kraft paper, wall paper, wax paper, silk paper, shredded currencies removed from circulation, wood fibers, glass fibers, shredded textiles, cotton fibers, hemp, mineral fiber chosen from wollastonite, mica, rock wool, slag wool, graphite, natural fibers chosen from sisal fibers, cotton, flax, jute, coconut husks, protein-based fibers, banana, pineapple, wool, mohair, silk, and mixtures of any of the foregoing.

18. The method of claim 17, wherein said formulation is combined with said cementitious material with a conveyor belt, a pneumatic system, a blower or a dispenser.

* * * * *